(12) United States Patent
Wu et al.

(10) Patent No.: US 6,545,783 B1
(45) Date of Patent: *Apr. 8, 2003

(54) OPTICAL WAVELENGTH ADD/DROP MULTIPLEXER

(75) Inventors: Kuang-Yi Wu, Plano, TX (US); Jian-Yu Liu, Garland, TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/273,920

(22) Filed: Mar. 22, 1999

Related U.S. Application Data

(63) Continuation-in-part of application No. 09/240,550, filed on Jan. 29, 1999, now Pat. No. 5,978,116, which is a continuation of application No. 08/739,424, filed on Oct. 29, 1996, now Pat. No. 5,867,291, which is a continuation-in-part of application No. 09/036,202, filed on Mar. 6, 1998, now Pat. No. 6,166,838, which is a continuation-in-part of application No. 09/156,211, filed on Sep. 17, 1998, now Pat. No. 6,285,478, and a continuation-in-part of application No. 09/048,557, filed on Mar. 26, 1998, now Pat. No. 6,208,442.

(60) Provisional application No. 60/042,373, filed on Mar. 24, 1997.

(51) Int. Cl.[7] ............................................... H04J 14/02
(52) U.S. Cl. ....................... 359/127; 359/126; 359/130
(58) Field of Search ................................ 359/122, 124, 359/127, 130, 126

(56) References Cited

U.S. PATENT DOCUMENTS

| | | | |
|---|---|---|---|
| 3,391,970 A | 7/1968 | Sincerbox | 350/150 |
| 3,500,102 A | 3/1970 | Crost et al. | 313/109 |
| 3,719,414 A | 3/1973 | Wentz | 350/150 |

(List continued on next page.)

FOREIGN PATENT DOCUMENTS

| | | | |
|---|---|---|---|
| EP | 0 307 244 A1 | 3/1989 | G02F/1/31 |
| EP | 0 370 410 A2 | 5/1990 | G02B/5/30 |
| JP | 61-97629 | 5/1986 | G02F/1/31 |
| JP | 1140134 | 6/1989 | G02F/1/31 |
| JP | 2007026 | 1/1990 | G02F/1/31 |
| JP | 3276119 | 12/1991 | G02F/27/28 |
| JP | 4128715 | 4/1992 | G02F/1/09 |
| JP | 6-181352 | 6/1994 | G02F/1/35 |
| WO | WO 98/19415 | 5/1998 | H04J/14/00 |
| WO | WO 98/47254 | 10/1998 | H04J/14/02 |

OTHER PUBLICATIONS

Jian–Yu Liu et al. "Digitally Programmable Wavelength–Switching Technology," DEEE/LEDS Summer Topical Meetings, pp. 9–10, Aug. 1997.

EPO Search Report, application No. EP 98 91 4607, 3 pages, May 19, 2000.

(List continued on next page.)

*Primary Examiner*—Leslie Pascal
(74) *Attorney, Agent, or Firm*—Baker Botts L.L.P.

(57) ABSTRACT

An optical wavelength add/drop multiplexer provides communications between two optical links supporting wavelength division multiplexing (WDM). A wavelength slicer spatially separates the input signal into two sets of channels. An optical filter, such as an interference filter, spatially separates the a subset of the input channels into an array of separated channels. A programmable optical add/drop switch array selectively routes channels from an array of input ports to an array of drop ports, substitutes channels from an array of add ports in place of the dropped channels, and routes the remaining input channels and added channels to an array of output ports. The channels from the output ports of the said add/drop switch array are then combined and transmitted into the second optical link. A network of wavelength slicers can be used to spatially separate the input signal into a larger number of sets of channels that can either be accessed by a number of add/drop switch arrays, or passed unchanged as "express lanes" to the second optical link. In an alternative embodiment, a circulated drop filter consisting of an optical circulator and a series of fiber Bragg gratings is used to select a predetermined series of input channels to be processed by the add/drop switch array, with the remaining channels being passed by the circulated drop filter as express lanes.

39 Claims, 9 Drawing Sheets

U.S. PATENT DOCUMENTS

| | | | |
|---|---|---|---|
| 3,892,468 A | 7/1975 | Duguay | 350/96 B |
| 3,920,983 A | 11/1975 | Schlafer et al. | 250/199 |
| 4,129,357 A | 12/1978 | Title | 350/157 |
| 4,227,208 A | 10/1980 | Takanashi et al. | 358/55 |
| 4,359,268 A | 11/1982 | Kondo | 350/377 |
| 4,461,543 A | 7/1984 | McMahon | 350/383 |
| 4,464,022 A | 8/1984 | Emkey | 350/377 |
| 4,514,046 A | 4/1985 | Carlsen et al. | 350/385 |
| 4,566,761 A | 1/1986 | Carlsen et al. | |
| 4,575,193 A | 3/1986 | Greivenkamp, Jr. | 350/401 |
| 4,626,897 A | 12/1986 | Sato et al. | 350/401 |
| 4,650,289 A | 3/1987 | Kuwahara | 358/44 |
| 4,671,613 A | 6/1987 | Buhrer | 350/375 |
| 4,678,287 A | 7/1987 | Buhrer | 350/404 |
| 4,685,773 A | 8/1987 | Carlsen et al. | |
| 4,744,075 A | 5/1988 | Buhrer | 370/3 |
| 4,745,591 A | 5/1988 | Foley | 370/3 |
| 4,772,104 A | 9/1988 | Buhrer | 350/403 |
| 4,919,522 A | 4/1990 | Nelson | |
| 4,987,567 A | 1/1991 | Buhrer | 370/3 |
| 5,009,477 A | 4/1991 | Alferness et al. | 350/96.15 |
| 5,033,830 A | 7/1991 | Jameson | 350/403 |
| 5,040,896 A | 8/1991 | Moslehi | 356/351 |
| 5,111,321 A | 5/1992 | Patel | 359/92 |
| 5,136,671 A | 8/1992 | Dragone | |
| 5,194,977 A | 3/1993 | Nishio | 359/128 |
| 5,204,771 A | 4/1993 | Koga | 359/281 |
| 5,231,521 A | 7/1993 | Johnson et al. | 359/93 |
| 5,243,455 A | 9/1993 | Johnson et al. | 359/93 |
| 5,262,892 A | 11/1993 | Nakamura | 359/484 |
| 5,274,679 A | 12/1993 | Abe et al. | 375/117 |
| 5,299,056 A | 3/1994 | Kurata et al. | 359/341 |
| 5,317,655 A | 5/1994 | Pan | 385/11 |
| 5,319,483 A | 6/1994 | Krasinski et al. | 359/113 |
| 5,341,444 A | 8/1994 | Henry et al. | 385/11 |
| 5,345,174 A | 9/1994 | Kimmich et al. | 324/309 |
| 5,351,317 A | 9/1994 | Weber | 385/3 |
| 5,355,249 A | 10/1994 | Souda et al. | 359/341 |
| 5,363,228 A | 11/1994 | DeJule et al. | |
| 5,381,250 A | 1/1995 | Meadows | |
| 5,414,540 A | 5/1995 | Patel et al. | 359/39 |
| 5,414,541 A | 5/1995 | Patel et al. | |
| 5,444,725 A | 8/1995 | Zirngibl | 372/20 |
| 5,463,493 A | 10/1995 | Shah | 359/312 |
| 5,481,402 A | 1/1996 | Cheng et al. | 359/498 |
| 5,488,500 A | 1/1996 | Glance | |
| 5,499,132 A | 3/1996 | Tojo et al. | 359/281 |
| 5,574,596 A | 11/1996 | Cheng | 359/484 |
| 5,579,420 A | 11/1996 | Fukushima | 358/11 |
| 5,596,661 A | 1/1997 | Henry et al. | |
| 5,600,742 A | 2/1997 | Zirngibl | 385/37 |
| 5,606,439 A | 2/1997 | Wu | |
| 5,612,805 A | 3/1997 | Fevrier et al. | |
| 5,619,359 A | 4/1997 | Redmond et al. | 359/117 |
| 5,680,490 A | 10/1997 | Cohen et al. | |
| 5,694,233 A | 12/1997 | Wu et al. | |
| 5,710,655 A | 1/1998 | Rumbaugh et al. | 359/249 |
| 5,718,226 A | 2/1998 | Riza | 128/660.01 |
| 5,724,165 A | 3/1998 | Wu | 359/117 |
| 5,729,377 A | 3/1998 | Bergmann | 359/249 |
| 5,748,350 A * | 5/1998 | Pan et al. | 359/130 |
| 5,751,384 A | 5/1998 | Sharp | 349/18 |
| 5,771,120 A | 6/1998 | Bergmann | 359/484 |
| 5,778,118 A | 7/1998 | Sridhar | |
| 5,781,293 A | 7/1998 | Padgett et al. | 356/346 |
| 5,809,190 A | 9/1998 | Chen | |
| 5,852,505 A | 12/1998 | Li | |
| 5,867,289 A | 2/1999 | Gerstel et al. | 359/110 |
| 5,912,748 A * | 6/1999 | Wu et al. | 359/117 |
| 5,923,472 A | 7/1999 | Bergmann | 359/618 |
| 5,930,028 A | 7/1999 | Bergmann | 359/303 |
| 5,930,039 A | 7/1999 | Li et al. | 359/484 |
| 5,953,141 A | 9/1999 | Liu et al. | |
| 6,002,512 A | 12/1999 | Bergmann et al. | 359/281 |
| 6,005,697 A * | 12/1999 | Wu et al. | 359/117 |
| 6,040,942 A | 3/2000 | Bergmann | 359/487 |
| 6,055,101 A | 4/2000 | Bergmann et al. | 359/484 |
| 6,067,178 A | 5/2000 | Zheng | 359/124 |
| 6,084,694 A * | 7/2000 | Milton et al. | 359/124 |
| 6,091,543 A | 7/2000 | Bergmann | 359/495 |
| 6,097,517 A | 8/2000 | Okayama | 359/124 |
| 6,097,518 A * | 8/2000 | Wu et al. | 359/127 |
| 6,115,155 A * | 9/2000 | Wu et al. | 359/127 |
| 6,125,221 A | 9/2000 | Bergmann et al. | 385/33 |
| 6,130,971 A * | 10/2000 | Cao | 359/131 |
| 6,134,031 A | 10/2000 | Nishi et al. | 359/15 |
| 6,173,092 B1 | 1/2001 | Bergmann | 385/16 |
| 6,288,807 B1 * | 9/2001 | Wu et al. | 359/124 |

OTHER PUBLICATIONS

PCT International Search Report, application No. PCT/US98/06982, 1 page, Jun. 22. 1998.

P. Melman et al., Tunable Birefringent Wavelength–Division Multiplexer/Demultiplexer Electronics Letters, The Institution of Electrical Engineers Publishing & Information Services.

W. J. Carlsen et al., Flat Passband Birefringent Wavelength–Division Multiplexers.

Yohji Fujii et al., Wavelength–Division Multi/Demultiplexer Utilizing Optically Active Crystals, Journal of Lightwave Technology, Jul. 1990, pp. 1051–1054, vol. 8, No. 7, IEEE.

Hideki Ishio et al., Review and Status of Wavelength–Division–Multiplexing Technology and Its Applicaiton, Journal Lightwave Technology, Aug. 1984, pp. 448–463, vol. LT–2, No. 4, IEEE.

H. F. Mahlein, Fiber–Optic Communication in the Wavelength–Division Multiplex Mode, Fiber and Integrated Optics, 1983, pp. 339–373, vol. 4, No. 4, Crane, Russak & Co., Inc.

Ammann, "Synthesis of Electro–Optic Shutters having a Prescribed Transmission vs Voltage Characteristic", Journal of the Optical Society of America (vol. 56, No. 8, pp. 1081–1088, Aug. 1966).

Harris et al., "Optical Network Synthesis Using Birefringent Crystals. *I. Synthesis of Lossless Networks of Equal–Length Crystals", Journal of the Optical Society of America (vol. 54, No. 10, pp. 1267–1279. 1964).

Senior et al., "Devices for Wavelength Multiplexing and Demultiplexing", IEE Proceedings (vol. 136, Pt. J, No. 3, Jun. 1989).

Nosu et al., "Optical FDM Transmission Technique", Journal of Lightwave Technology (vol. LT–5, No. 9, Sep. 1987).

Inoue et al., "A Four–Channel Optical Waveguide Multi/Demultiplexer for 5–GHz Spaced Optical FDM Transmission", Journal of Lightwave Technology (vol. 6, No. 2, Feb. 1988).

Chung et al., "Analysis of a Tunable Multichannel Two–Mode–Interference Wavelength Division Multiplexer/Demultiplexer", Journal of Lightwave Technology (vol. 7, No. 5, May 1989).

Damask et al., "Wavelength–Division Multiplexing using Channel–Dropping Filters", Journal of Lightwave Technology (vol. 11, No. 3, Mar. 1993).

* cited by examiner (Bridge State)

(Add/Drop State)

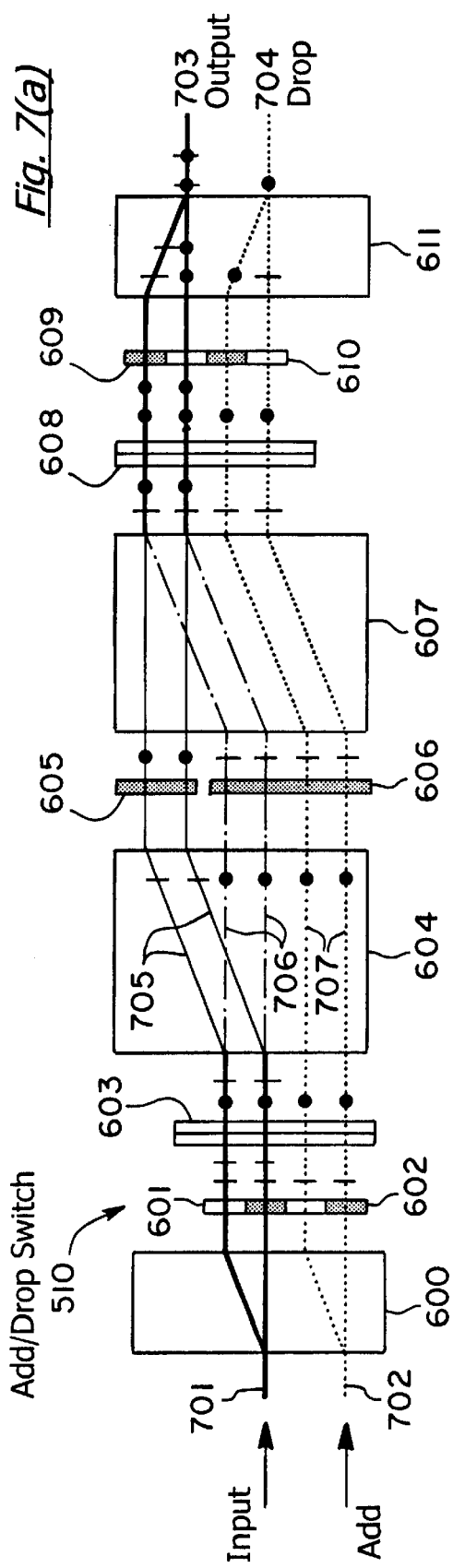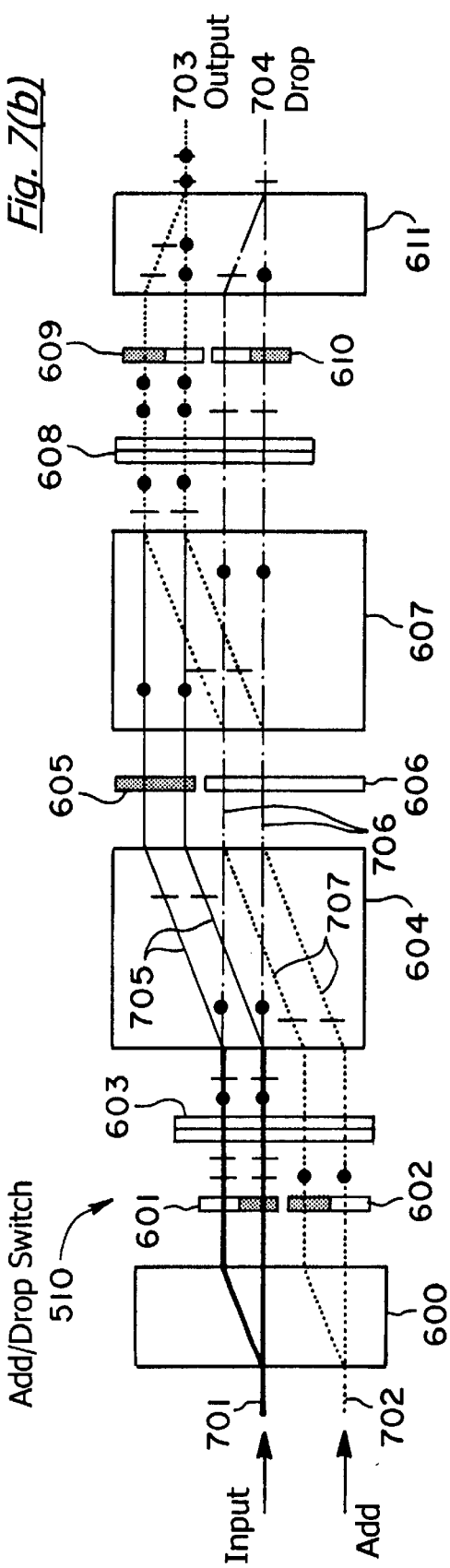

OPTICAL WAVELENGTH ADD/DROP MULTIPLEXER

RELATED APPLICATIONS

The present application is a continuation-in-part of the Applicants' U.S. patent application Ser. No. 09/240,550, entitled "Optical Wavelength Route", now U.S. Pat. No. 5,978,116 filed on Jan. 29, 1999, which is a continuation of U.S. patent application Ser. No. 08/739,424, entitled "Programmable Wavelength Router", filed on Oct. 29, 1996, now U.S. Pat. No. 5,867,291, issued on Feb. 2, 1999. The present application is also a continuation-in-part of the Applicant's U.S. patent application Ser. No. 09/036,202, entitled "Optical Add/Drop Wavelength Switch", filed on Mar. 6, 1998, now U.S. Pat. No. 6,166,838, issued on Dec. 26, 2000, which is based on the Applicants' U.S. Provisional Patent Application 60/042,373, filed on Mar. 24, 1997. The present application is also a continuation-in-part of the Applicants' U.S. patent application Ser. No. 09/156,211 entitled "Programmable Optical Add/Drop Multiplexer," filed on Sep. 17, 1998 now U.S. Pat. No. 6,285,478, and U.S. patent application Ser. No. 09/048,557, entitled "Programmable Optical Multiplexer," filed on Mar. 26, 1998 now U.S. Pat. No. 6,208,442.

GOVERNMENT INTERESTS

The invention was made with government support under Contract DARPA II: DAAH01-97-C-R308 awarded by U.S. Army Missile Command, AMSMI-AC-CRAY, Redstone Arsenal, AL 35898. The government has certain rights in the invention.

BACKGROUND OF THE INVENTION

1. Field of the Invention

The present invention relates generally to the field of optical communications. More specifically, the present invention discloses an optical wavelength add/drop multiplexer for use in wavelength division multiplex (WDM) optical communications.

2. Statement of the Problem

Optical wavelength division multiplexing has gradually become the standard backbone network for fiber optic communication systems. WDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM technology.

Despite the substantially higher fiber bandwidth utilization provided by WDM technology, a number of serious problems must be overcome, for example, multiplexing, demultiplexing, and routing optical signals, if these systems are to become commercially viable. The addition of the wavelength domain increases the complexity for network management because processing now involves both filtering and routing. Multiplexing involves the process of combining multiple channels (each defined by its own frequency spectrum) into a single WDM signal. Demultiplexing is the opposite process in which a single WDM signal is decomposed into individual channels. The individual channels are spatially separated and coupled to specific output ports. Routing differs from demultiplexing in that a router spatially separates the input optical channels to output ports and permutes these channels according to control signals to a desired coupling between an input channel and an output port.

The Applicants' U.S. Pat. No. 5,724,165 and U.S. patent application Ser. No. 08/739,424 (Kuang-Yi Wu et al.) teach two independent methods for high performance signal routing (U.S. Pat. No. 5,724,165) and wavelength de-multiplexing (Ser. No. 08/739,424). In U.S. Pat. No. 5,724,165, new structures for realizing optical switches (routers) were disclosed that achieve very high extinction ratios. However, these switches are wavelength independent. In Ser. No. 08/739,424, a system is disclosed to provide the functions of wavelength de-multiplexing and routing. However, this single stage design relies primarily on the filter design. The transmission function of the filter has to be close to an ideal square flat-top to realize the desired low crosstalk operation.

Other prior art in the field includes the following:

| Inventor | U.S. Pat. No. | Issue Date |
| --- | --- | --- |
| Glance | 5,488,500 | Jan. 20, 1996 |
| Patel et al. | 5,414,541 | May 9, 1995 |
| Meadows | 5,381,250 | Jan. 10, 1995 |
| DeJule et al. | 5,363,228 | Nov. 9, 1994 |
| Nelson | 4,919,522 | Apr. 24, 1990 |

Ammann, "Synthesis of Electro-Optic Shutters Having A Prescribed Transmission vs. Voltage Characteristic," *Journal of the Optical Society of America*, vol. 56, no. 8, pp. 1081–1088 (August 1966)

Harris et al., "Optical Network Synthesis Using Birefringent Crystals* I. Synthesis of Lossless Networks of Equal-Length Crystals," *Journal of the Optical Society of America*, vol. 54, no. 10, pp. 1267–1279 (October 1964)

Patel et al. disclose an optical switch using a series of birefringent layers and ferroelectric cells to route an input beam to any of a plurality of output positions.

Glance discloses a tunable add/drop filter using a 1×N optical switch, a wavelength grating router (WGR), and a multiplexer. The WGR outputs include a set of retain outputs that are coupled directly to the multiplexer and a drop output. The particular WDM frequency component that is routed to the drop output is determined by the WGR input port at which the WDM signal is received. The 1×N switch provides the WDM signal to the proper WGR input so that a selected frequency is provided to the drop output. The retained signals and any added signals are multiplexed by the multiplexer.

DeJule et al. disclose an optical switching device using a plurality of polarization-independent switching cells arranged in matrix form. Each switching cell consists of a spatial light modulator and a number of polarized beamsplitters that can be used to selectively direct an input optical beam along either of two axes.

Nelson discloses an optical switch employing an electro-optical crystal that exhibits birefringence in each of two different light paths when the crystal is disposed in orthogonally-oriented electric fields. Each light path is sensitive to a different one of the two electric fields and has its own set of fast and slow axes.

Meadows discloses a 2×2 electro-optical switch that employs dielectric film polarizing beamsplitters and a switchable electro-optic retarder.

Ammann and Harris et al. provide general background in the field of optical filter design.

3. Solution to the Problem

None of the prior art references discussed above show an optical wavelength add/drop multiplexer that uses a network of wavelength slicers to separate the input WDM channels from a first optical link into a plurality of sets of channels. At least one set of channels is then separated into individual channels by an interference filter to interface with an add/drop switch array. The output channels from the add/drop switch array and a selected set of channels from the wavelength slicer network can be combined and transmitted over a second optical link.

SUMMARY OF THE INVENTION

This invention provides an optical wavelength add/drop multiplexer for communications between two optical links supporting wavelength division multiplexing (WDM). A wavelength slicer spatially separates the input signal into two sets of channels. An optical filter, such as an interference filter, spatially separates the a subset of the input channels into an array of separated channels. A programmable optical add/drop switch array selectively routes channels from an array of input ports to an array of drop ports, substitutes channels from an array of add ports in place of the dropped channels, and routes the remaining input channels and added channels to an array of output ports. The channels from the output ports of the said add/drop switch array are then combined and transmitted into the second optical link. A network of wavelength slicers can be used to spatially separate the input signal into a larger number of sets of channels that can either be accessed by a number of add/drop switch arrays, or pass unchanged as "express lanes" to the second optical link. In an alternative embodiment, a circulated drop filter consisting of an optical circulator and a series of fiber Bragg gratings is used to select a predetermined series of input channels to be processed by the add/drop switch array, with the remaining channels being passed by the circulated drop filter as express lanes.

A primary object of the present invention is to provide an optical wavelength add/drop multiplexer that can separate multiple channels from an input WDM signal and selectively substitute channels from series of add ports in place of the input channels.

Another object of the present invention is to provide an optical wavelength add/drop multiplexer that can be use to augment the channel capacity of an existing central office equipment for optical communications.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 7(a) and 7(b) are schematic block diagrams of an optical add/drop switch 510 in the bridge state and add/drop state, respectively.

DETAILED DESCRIPTION OF THE INVENTION

Figure 1:
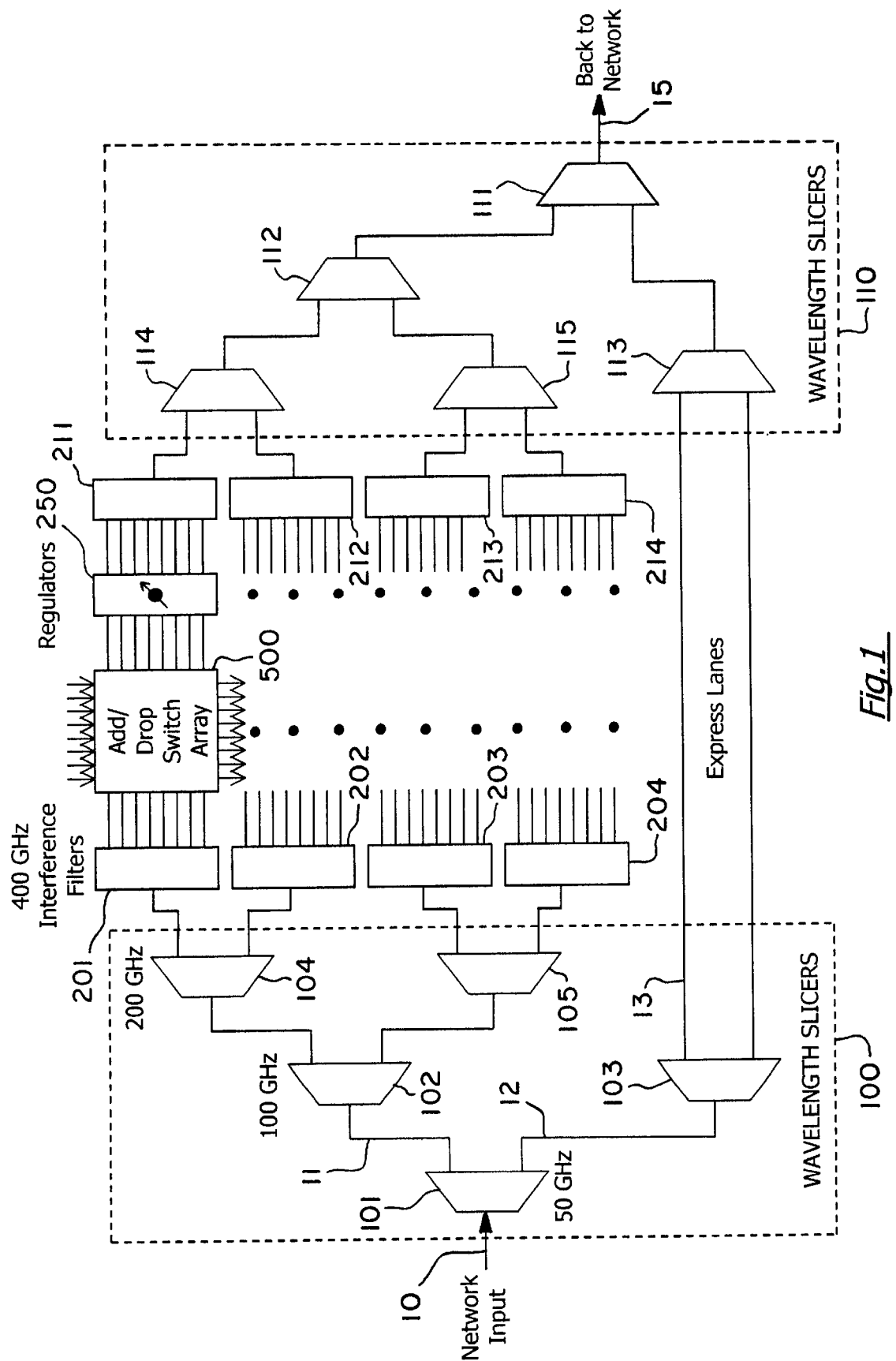
FIG. 1 is a schematic block diagram of the overall optical wavelength add/drop multiplexer.

FIG. 1 provides an overall schematic diagram of an embodiment of the present invention using two networks 100 and 110 of wavelength slicers. Input WDM signals 10 from an optical link are coupled to the input port of a first wavelength slicer 101. The input WDM signal consists of multiple channels with each channel having its own range of wavelengths or frequencies. As used herein, the terms "channel" or "spectral band" refer to a particular range of frequencies or wavelengths that define a unique information signal. Each channel is usually evenly spaced from adjacent channels, although this is not necessary. Uneven spacing may result in some complexity in design, but, as will be seen, the present invention can be adapted to such a channel system. This flexibility is important in that the channel placement is driven largely by the technical capabilities of transmitters (i.e., laser diodes) and detectors and so flexibility is of significant importance.

Figure 2:
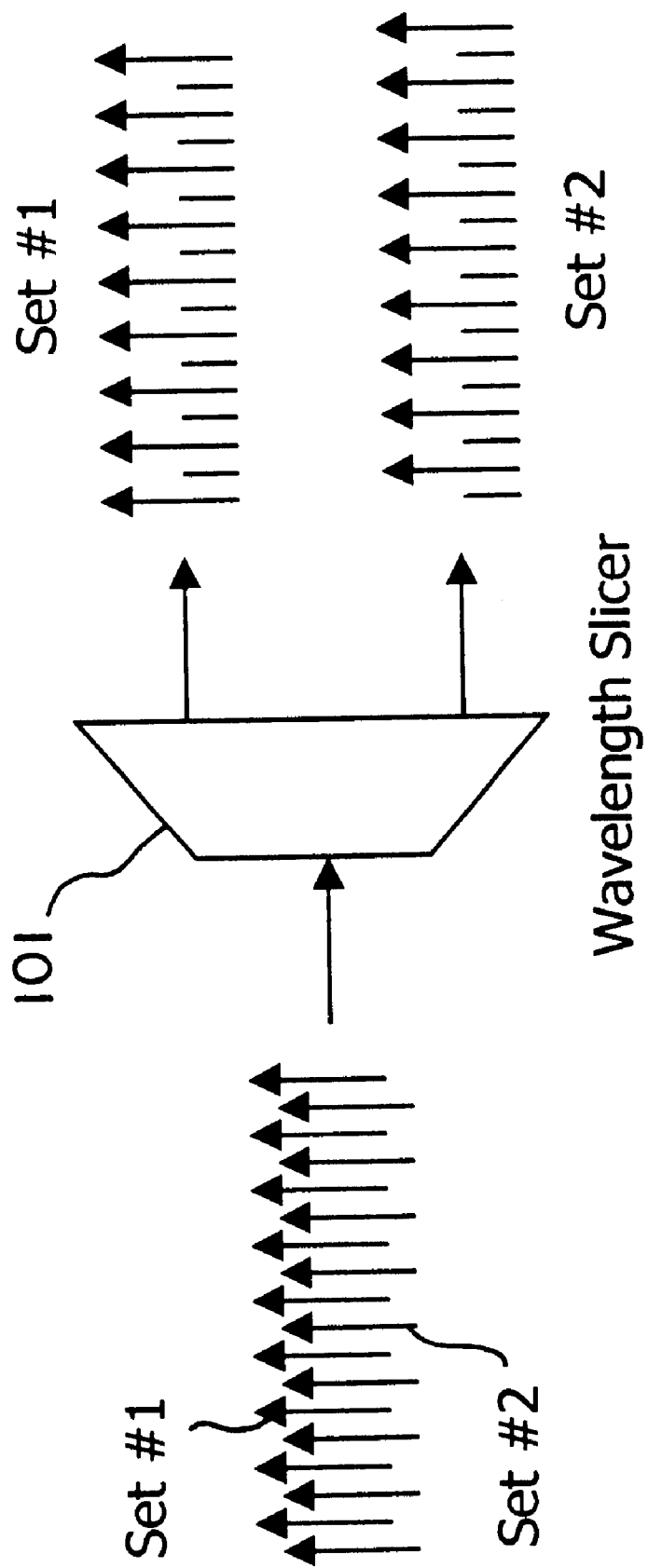
FIG. 2 is a simplified block diagram illustrating the functionality of the wavelength slicer 101.
Figure 4:
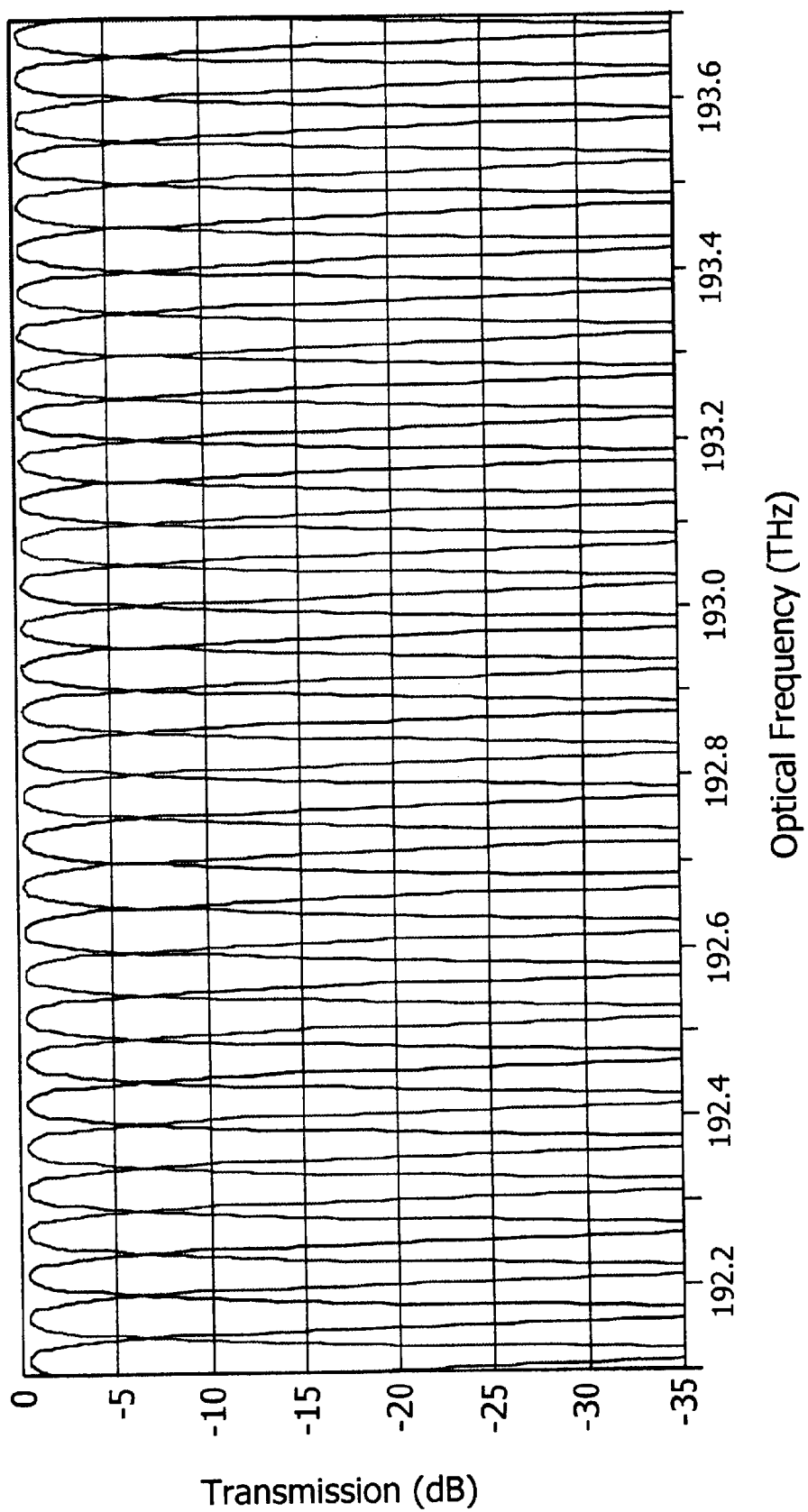
FIG. 4 is a spectral diagram of the transmission function of a wavelength slicer for separating adjacent 50 GHz input channels into two sets of output channels.

Operation of the wavelength slicer 101 is describe in detail below. However, to summarize, each wavelength slicer 101–105 in the wavelength slicer network 100 spatially separates a set of input WDM channels into two complementary sets of output channels. In the preferred embodiment, each wavelength slicer separates alternating adjacent input channels into first and second sets of output channels as shown in FIG. 2. Thus, returning to FIG. 1, the first wavelength slicer 101 separates the network input signal 10 into a first set of channels 11 that are routed to wavelength slicer 102, and a second set of channels 12 that are routed to wavelength slicer 103. For example, the initial wavelength slicer 101 can separate channels based on a 50 GHz spacing between adjacent channels, as depicted in FIG. 4.

As illustrated in FIG. 1, the first set of channels output by the initial wavelength slicer 101 is routed along a first optical path 11 to second and third stage wavelength slicers 102, 104, and 105. The second set of channels output by the initial wavelength slicer 101 is routed along a second optical path 12 to wavelength slicer 103. The second stage of wavelength slicers 102, 103 further separate the input channels into four sets of channels. For example, in the embodiment shown in FIG. 1, the second stage of wavelength slicers 102, 103 separates channels based on a 100 GHz spacing between adjacent channels. This process can be continued by cascading additional stages of wavelength slicers to achieve up to $2^N$ sets of channels, where N is the number of stages. For example, the wavelength slicer network 100 shown in FIG. 1 has a partial third stage consisting of wavelength slicers 104 and 105.

In contrast, the output channels from wavelength slicer 103 exit the first wavelength slicer network 100 along optical path 13 without further processing. These output channels are referred to as "express lanes" and pass directly to the second wavelength slicer network 110 used to recombine the optical signals that are to be returned to the optical network, as will be discussed below. Optionally, wavelength slicers 103 and 113 could be eliminated so that the second set of optical signals from the initial wavelength slicer 101 would serve as the express lanes and pass directly to the final wavelength slicer 111 in the second wavelength slicer network 110.

Returning to the third stage of wavelength slicers 104 and 105 in FIG. 1, the first set of channels are further subdivided into four sets of channels that are received as inputs by an array of optical filters 201, 202, 203, and 204. These optical filters 201–204 separate the input sets of channels into an array of separated channels. The implementation shown in FIG. 1 is based on commercially-available grating interference filter arrays that can separate up to eight channels. However, other types of optical filters can be employed for spatially separating the channels. The type of optical filter used and the number of filters in the array are purely matters of convenience of design.

The array of separated channels are connected to the input ports of a series of programmable optical add/drop switch arrays 500. Here again, any number of add/drop switch arrays can be employed to handle any desired number of channels based on design requirement.

Figure 5:
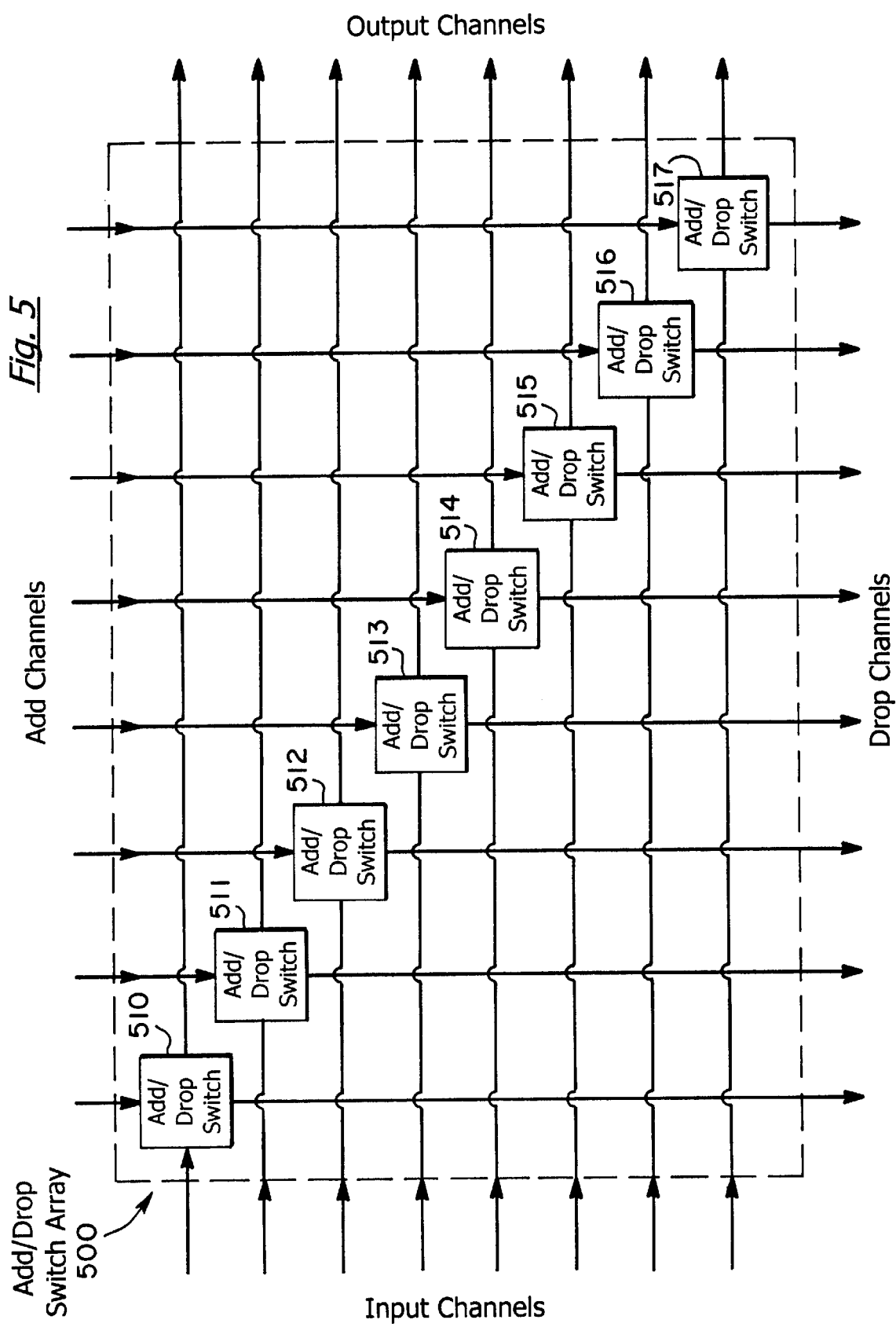
FIG. 5 is a schematic block diagram of the optical add/drop switch array 500.

Each add/drop switch array 500 also has a corresponding arrays of output ports, add ports, and drop ports. The add/drop switch array 500 selectively routes channels from the input ports to its drop ports; substitutes channels from the add ports in place of the dropped channels; and routes the remaining input channels and the added channels to the output ports of the add/drop switch array 500. FIG. 5 is a schematic block diagram of the optical add/drop switch array 500 showing a diagonal array of eight individual add/drop switches 510–517 than can be individually controlled to selectively replace one of the input channels with one of the add channels.

Figure 6A:
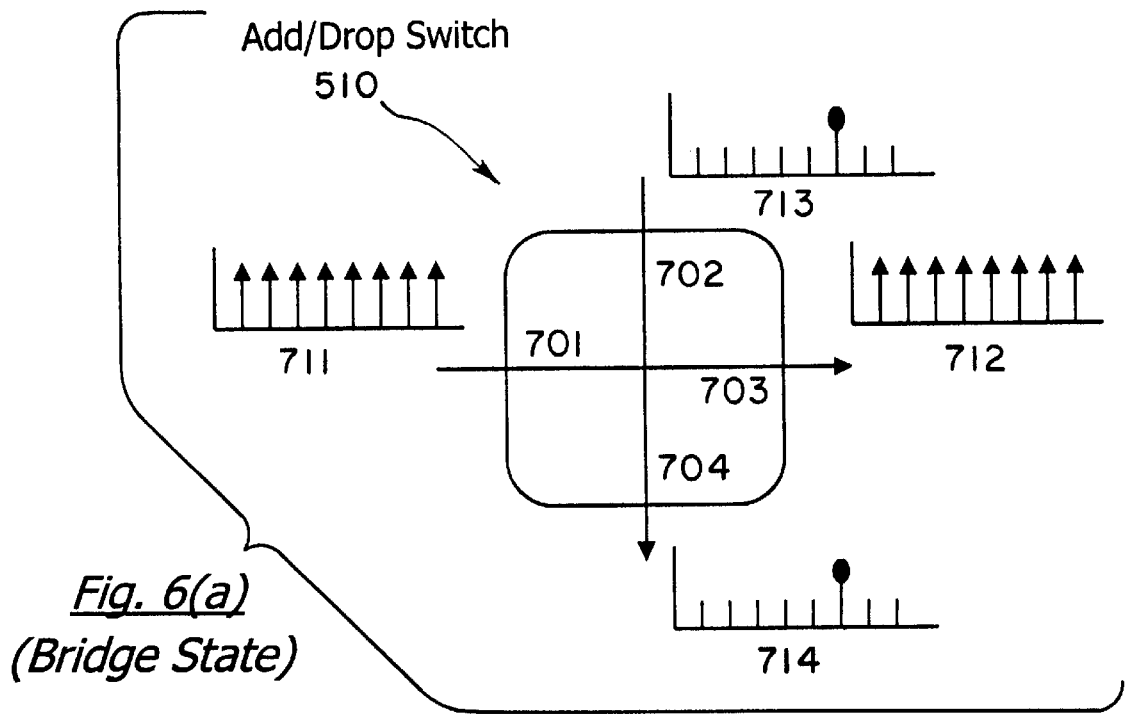
FIGS. 6(a) and 6(b) are simplified block diagrams illustrating the functionality of an individual optical add/drop switch 510 in the bridge state and add/drop state, respectively.
Figure 6B:
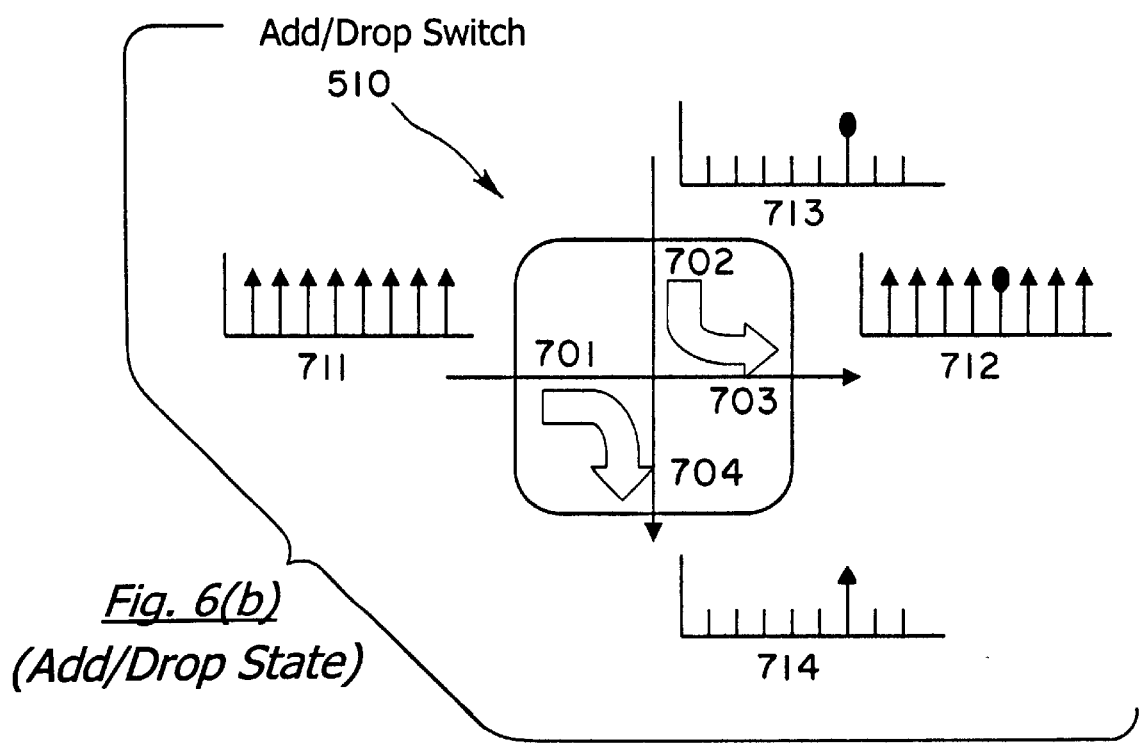

The details of the structure and operation of an individual add/drop switch are discussed at length below with regard to FIGS. 3, 7(a) and 7(b). FIGS. 6(a) and 6(b) provide a simplified overview illustrating the bridge state and add/drop state, respectively, for an individual add/drop switch 510. In the bridge state depicted in FIG. 6(a), the channels at the input port 711 are routed unchanged to the output port 712, and the add channel 713 is routed unchanged to the drop port 714 of the add/drop switch 510. In contrast, FIG. 6(b) shows the add/drop state in which the add/drop switch 510 selectively routes one of the input channels 711 to its drop port 714, substitutes the add channel 713 in place of the dropped channel, and routes the remaining input channels and the added channel to the output port 712 of the add/drop switch 510.

Returning to FIG. 1, it should be noted that this combination of a network slicer network 100, optical filters 201–204, and add/drop switch arrays 500, allow any combination of input channels to be replaced with any combination of add channels. In contrast, many prior art systems permit only an incomplete set of the possible combinations of input channels and add channels due to blocking problems.

The array of output channels from the add/drop switch array 500 passes through a regulator 250 which adjustably regulates the optical power level of each channel. The output channels are then combined so that they can be transmitted through a second optical link 15 in the optical network. In the embodiment of the present invention illustrated in FIG. 1, the means for combining the output channels consists of a second array of interference filters 211–214 and a second wavelength slicer network 110. These devices are inherently bidirectional, and therefore can be used to multiplex as well as demultiplex the WDM signal for the optical network. Each of the interference filters 211–214 in the second array combine eight channels as an inverse operation of that performed by the first array of interference filters 201–204. The second array of interference filters 211–214 also serve to purify the spectral characteristics of the output channels and reduce cross-talk. Wavelength slicers 114, 115, and 112 in the second wavelength slicer network 110 multiplex the sets of channels from the second array of interference filters 211–214 as an inverse operation to the demultiplexing provided by wavelength slicers 102, 104, and 105 in the first wavelength slicer network 100. Similarly, wavelength slicers 113 and 111 combine the express lanes 13 with the multiplexed channels from the wavelength slicer 112 to reconstitute the entire WDM signal for the optical network.

It should be understood that other means could be readily substituted to combine output channels from the add/drop switch arrays 500 and the express lanes 13 since each channel has a unique wavelength. For example, a network of polarized beamsplitters could be employed to combine the channels.

Wavelength Slicer. FIG. 2 is a block diagram illustrating the general functionality of an individual wavelength slicer 101 as a component in the overall system shown in FIG. 1. The input WDM signal is coupled using conventional optical signal coupling techniques to the input port of the wavelength slicer 101. The wavelength slicer 101 separates the input signal into two sets of channels, which are routed to the output ports as depicted in FIG. 2. In the preferred embodiment, the wavelength slicer 101 separates alternating adjacent input channels into the first and second sets of output channels as shown in FIG. 2. FIG. 4 illustrates the transmission characteristics of a wavelength slicer with a channel spacing of 50 GHz. If multiple stage of wavelength slicers are employed as shown in FIG. 1, it should be noted that the channel spacing for each successive stage will be twice that of the previous stage due to the interdigital slicing of adjacent channels.

Figure 3:
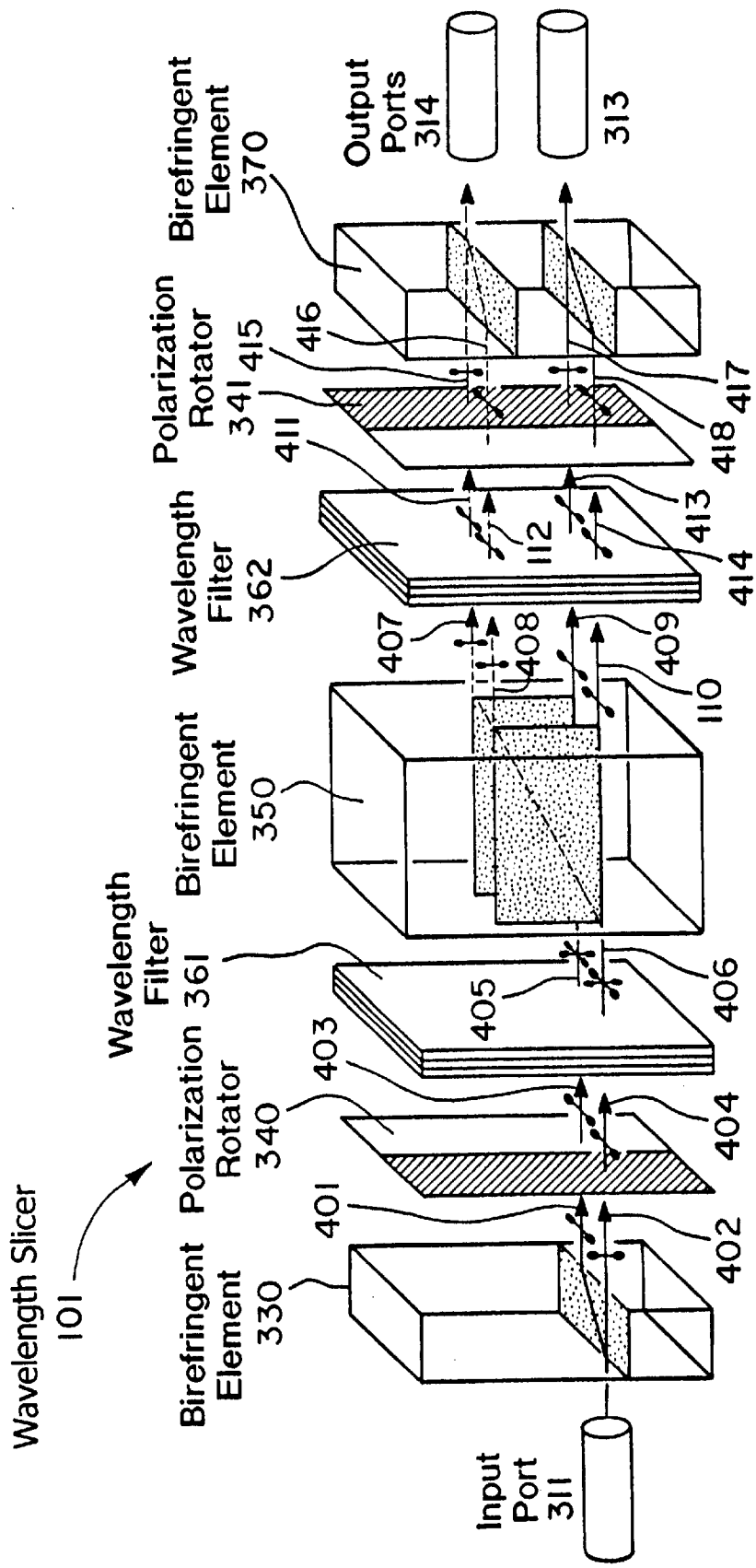
FIG. 3 is a schematic block diagram of the wavelength slicer 101.

FIG. 3 is a schematic diagram of an individual wavelength slicer 101. Each of the optical paths is labeled with either a horizontal double-headed line indicating horizontal polarization, or a vertical double-headed line indicating vertical polarization, or both horizontal and vertical double-headed lines indicating mixed horizontal and vertical polarizations in the optical signal at that point.

The input signal 311 enters the first birefringent element 330 that spatially separates horizontal and vertically polarized components of the input signal. The first birefringent element 330 consists of a material that allows the vertically polarized portion of the optical signal to pass through without changing course because they are ordinary waves in the birefringent element 330. In contrast, horizontally-polarized waves are redirected at an angle because of the birefringent walk-off effect. The angle of redirection is a well-known function of the particular materials chosen. Examples of materials suitable for construction of the birefringent element include calcite, rutile, lithium niobate, $YVO_4$-based crystals, and the like. The horizontally-polarized component travels along a path 401 as an extraordinary signal in the first birefringent element 330 while the vertically polarized component 402 travels as an ordinary signal and passes through without spatial reorientation. The resulting signals 401 and 402 both carry the full frequency spectrum of the input signal 311.

At least one of the beam components 401 and 402 are coupled to a polarization rotator 340 which selectively rotates the polarization state of either beam component 401 or 402 by a predefined amount. In the preferred embodiment, the rotator 340 rotates the signals by either 0° (i.e., no rotation) or 90°. In FIG. 3, the vertically-polarized component 402 is rotated by 90° so that both signals 403, 404 exiting the polarization rotator 340 have a horizontal polarization. Again, at this stage, both the horizontal and vertical components 402, 403 contain the entire frequency spectrum of channels in the input WDM signal 311.

The stacked waveplates element 361 is a stacked plurality of birefringent waveplates at selected orientations that generate two eigen states. The first eigen state carries a first set of channels with the same polarization as the input, and the second eigen state carries a complementary set of channels at the orthogonal polarization. The polarization of the incoming beam and the two output polarizations form a pair of spectral responses, where (H, H) and (V, V) carry the first set of channels from the input spectrum and (H, V) and (V, H) carry the complementary (second) set of channels of the input spectrum, where V and H are vertical and horizontal polarization, respectively. With horizontal polarizations 403, 404 input to the stacked waveplates element 361 as illustrated in FIG. 3, orthogonal vertical and horizontal polarizations are generated with the first set of channels residing in horizontal polarization and the second set of channels residing in vertical polarization.

Returning to FIG. 3, the pairs of optical responses 405, 406 output by the stacked waveplates element 361 are coupled to a second birefringent element 350. This birefringent element 350 has a similar construction to the first birefringent element 330 and spatially separates the horizontally and vertically polarized components of the input optical signals 405 and 406. As shown in FIG. 3, the optical signals 405, 406 are broken into vertically-polarized components 407, 408 containing the second set of channels and horizontally-polarized components 409, 410 containing the first set of channels. Due to the birefringent walk-off effect, the two orthogonal polarizations that carry first set of channels 409, 410 in horizontal polarization and second set of channels 407, 408 in vertical polarization are separated by the second birefringent element 350.

Following the second birefringent element 350, the optical elements on the input side of the second birefringent element 350 can be repeated in opposite order, as illustrated in FIG. 3. The second stacked waveplates element 362 has substantially the same composition as the first stacked waveplates element 361. The horizontally-polarized beams 409, 410 input to the second stacked waveplates element 362, are further purified and maintain their polarization when they exit the second stacked waveplates element 362. On the other hand, the vertically-polarized beams 407, 408 experience a 90° polarization rotation and are also purified when they exit the second stacked waveplates element 362. The 90° polarization rotation is due to the fact that the vertically-polarized beams 407, 408 carry the second set of channels and are in the complementary state of stacked waveplates element 362. At the output of the stacked waveplates element 362, all four beams 411, 412 and 413, 414 have horizontal polarization. However, the spectral bands defined by the filter characteristics of the stacked waveplates elements 361, 362 are separated with the second set of channels on top and the first set of channels below.

To recombine the spectra of the two sets of beams 411, 412 and 413, 414, a second polarization rotator 341 and a third birefringent element 370 are used. The second rotator 341 intercepts at least two of the four parallel beams 411–414 and rotates the polarization of the beams to produce an orthogonally-polarized pair of beams 415, 416 and 417, 418 for each spectral band at the output of the second polarization rotator 341. In the case of FIG. 3, the polarization of beams 411 and 413 is rotated by 90°, and beams 412 and 414 are passed without change of polarization. Finally, a third birefringent element 370 recombines the two orthogonally-polarized beam pairs 415, 416 and 417, 418 using the walk-off effect to produce two sets of channels that exit at the output ports 314 and 313, respectively.

Optical Add/Drop Switch Array. As mentioned above, FIG. 5 is a schematic diagram of an array 500 of optical add/drop switches 510–517. FIGS. 6(a) and 6(b) illustrate in block diagram form the general functionality of an individual add/drop switch 510 in the array. The input WDM signal 711 is fed into an input port 701 using conventional optical signal coupling techniques to the add/drop wavelength switch 510. In the bridge state shown in FIG. 6(a), the input signal 711 passes through the add/drop switch 510 uninterrupted and exits at port 703. The add port 702 and drop port 704 are connected to form a "bridge" in which no add/drop operation occurs. The add signal 713 that is input through the add port 702 passes through the add/drop switch 510 and exits at the drop port 704 as the drop signal 714.

In contrast, when the add/drop switch 510 is switched to the add/drop state shown in FIG. 6(b), a pre-defined optical channel is extracted from the input signal 711 and exits as the drop signal 714 at the drop port 704. The add signal 713, on the other hand, is combined with the pass-through portion of the input signal to exit at the output port 703 as shown in FIG. 1b.

FIGS. 7(a) and 7(b) further illustrate an individual add/drop wavelength switch 510 in schematic form in the bridge and add/drop control states, respectively. In accordance with the preferred embodiment, the add/drop switch 510 is under binary control from a control bit. In FIGS. 7(a) and 7(b), bold solid lines indicate the optical paths for the full spectrum of channels in the WDM input signal 701. Solid thin lines indicate the optical paths of signals comprising a first subset of channels from the WDM signals that are to pass through the add/drop switch 510 undisturbed (i.e., the pass-through channels). Thin-intermittent dashed lines indicate the optical paths for the drop channels that comprise a second subset of the input channels. Thin dotted lines indicate the optical path for the add signal. Finally, thick dotted lines are the optical paths for the pass-through subset of input channels combined with the add signal. It is important to understand that each of these subsets may comprise more than one channel and may itself be a set of WDM signals. Each of the lines representing optical paths are further labeled with either a short perpendicular line indicating horizontal polarization, or a large dot indicating vertical polarization, or both a perpendicular line and a large dot indicating mixed horizontal and vertical polarizations in the optical signal at that point.

In FIG. 7(a), the input signals 701 and the add signal 702 enter a first birefringent element 600 that spatially separates the horizontal and vertically polarized components of these signals 701, 702. The first birefringent element 600 is made of a material that allows the vertically polarized portion of the optical signal to pass through without changing course because they are ordinary waves in the birefringent element 600. In contrast, horizontally polarized waves are redirected at an angle because of the birefringent walk-off effect. The angle of redirection is a well-known function of the particular materials chosen. Examples of materials suitable for construction of the birefringent elements used in the preferred embodiments include calcite, rutile, lithium niobate, YVO$_4$-based crystals, and the like. A polarization beam splitter can also be used to perform a similar function for polarization separation.

The vertically polarized components from the input WDM signal 701 are coupled into a fixed polarization rotator 601 such that the state of polarization (SOP) becomes horizontal. The add signal 702 is coupled to a switchable polarization rotator 602 under control of a control bit. Switchable polarization rotator 602 consists of two sub-element rotators that form a complementary state, i.e. when one turns on the other turns off. Rotator 602 serves to selectively rotate the polarization of the add signal 702 by a predefined amount. In the preferred embodiment, rotator 602 rotates the polarization of the signals by either 0° (i.e., no rotation) or 90°. In FIGS. 7(*a*) and 7(*b*), gray-shaded areas indicate polarization rotation and white (transparent) areas indicate no polarization rotation. The switchable polarization rotator 602 can be made of one or more types of known elements including parallel aligned liquid crystal rotators, twisted nematic liquid crystal rotators, ferroelectric liquid crystal rotators, pi-cell liquid crystal rotators, magneto-optic based Faraday rotators, acousto-optic and electro-optic polarization rotators. Commercially available rotators using liquid crystal based technology are preferred, although other rotator technologies may be applied to meet the needs of a particular application. The switching speeds of these elements range from a few milliseconds to nanoseconds, and therefore can be applied to a wide variety of systems to meet the needs of a particular application. These and similar basic elements are considered equivalents and may be substituted and interchanged without departing from the spirit of the present invention.

FIG. 7(*a*) illustrates the bridge state in which the signals exiting the polarization rotators 601 and 602 have horizontal polarization. A first stacked waveplates element 603 is made of a stacked plurality of birefringent, composite waveplates at selected orientations that generate two eigen states. The first eigen state carries a first sub-spectrum with the same polarization as the input, and the second eigen state carries a complementary sub-spectrum at the orthogonal polarization. The polarization of the incoming beam and the two output polarizations form a pair of spectral responses, where (H, H) and (V, V) carry the first part of the input spectrum and (H, V) and (V, H) carry the complementary (second) part of the input spectrum, where V and H are vertical and horizontal polarizations, respectively. Further details of the design and the filtering mechanism of the stacked waveplates element are disclosed in the Applicants' U.S. patent application Ser. No. 08/739,424 and U.S. Pat. No. 5,694,233. In the case of this add/drop wavelength switch, the first eigen state carries the first sub-spectrum (i.e., the pass-through channels) with the same polarization as the input, and the second eigen state carries a complementary sub-spectrum (i.e., the add/drop channels) at the orthogonal polarization.

The input channels 701 are decomposed into two components having orthogonal polarizations as they pass through the first stacked waveplates element 603. The pass-through spectrum 705 is coded in the horizontal polarization and the drop spectrum 706 is coded in the vertical polarization. The add signal 702, has a horizontal polarization before entering the stacked waveplates element 603. It is rotated by 90° as it passes through the first stacked waveplates element 603, because it has the same spectrum as the drop channel. At the plane after the first stacked waveplates element 603 as shown in FIG. 7(*a*), the add/drop channels are vertically polarized, while the pass-through spectrum is horizontally polarized.

Optical signals 705, 706, and 707 represent the pass-through, drop, and add signals that are coupled to the second birefringent element 604. The second birefringent element 604 has a similar construction to the first birefringent element 600 and serves to spatially separate the horizontally and vertically polarized components of the optical signals 705, 706, and 707. The two orthogonal polarizations that carry the pass-through spectrum 705 in horizontal polarization and the add/drop spectrum 707, 706 in vertical polarization are separated by the second birefringent element 604 because of the birefringent walk-off effect.

A second set of polarization rotators 605 and 606 follow the second birefringent element 604. The pass-through signal 705 passes through a fixed-type rotator 605 that rotates the polarization by 90°. The add/drop signals 707, 706 pass through a switchable polarization rotator 606 that is also set to rotate the polarization by 90° in the bridge state (see FIG. 7(*a*)). At the exit plane of the polarization rotators 605 and 606, the pass-through spectrum has vertical polarization and the add/drop spectra have horizontal polarization, as indicated in FIG. 7(*a*).

Following the second set of polarization rotators 605 and 606, the preceding components can be repeated, but arranged in opposite order. As shown for the bridge state in FIG. 7(*a*), a third birefringent element 607 recombines the pass-through spectrum 705 and the drop signal 706 because of the walk-off effect. Thus, in the bridge state, no add/drop operation occurs. The add signal 707 propagates upward in the third birefringent element 607 and keeps its horizontal polarization.

The second stacked waveplates element 608 has the same structure and composition as to the first stacked waveplates element 603. With the horizontally-polarized beams 706, 707 input to the second stacked waveplates element 608, the add/drop spectrum is further purified and rotates its polarization by 90°. On the other hand, the vertically-polarized beam 705 (carrying the pass-through signals) input to the second stacked waveplates element 608 maintains its polarization but is also purified when it exits the second stacked waveplates element 608. The 90° polarization rotation of the horizontally polarized beams 706, 707 is due to the fact that the add/drop spectrum is the complementary state of the second stacked waveplates element 608. At the output of second stacked waveplates element 608, all four beams have vertical polarization. In the bridge state depicted in FIG. 7(*a*), the upper two beams carry the full input spectrum and the lower two beams carry the add signal's spectrum.

To recombine the two sets of beams, a third set of polarization rotators 609 and 610 and a fourth birefringent element 611 are used. Again, the third set of polarization rotators consists of a fixed-type polarization rotator 609 and a switchable polarization rotator 610. Both polarization rotators 609 and 610 have two sub-elements that intercept the two sets of beams. The pass-through signals (i.e., the complete input signals in the bridge state) carried by the upper two beams (indicated by the heavy solid lines after the third birefringent element 607 in FIG. 7(*a*)) pass through the fixed polarization rotator 609 such that one of the upper beams has its polarization is rotated by 90°. The two orthogonal polarizations are then recombined by the fourth birefringent element 611 to exit at output port 703.

The two lower beams carrying the add signal pass through the switchable polarization rotator 610 so that the polarization of one of the lower beams is rotated by 90°. They are then recombined by the fourth birefringent element 611. In this design, the sub-elements of the third set of polarization rotators 609 and 610 are set at complementary states to the corresponding sub-elements in the first set of polarization rotators 601 and 602. This complementary design assures high contrast operation for the polarization rotators and further assures high isolation for spectral filtering. This completes the bridge state of operation for the add/drop wavelength switch 510.

In the add/drop state, the optical paths are shown in FIG. 7(b). The three switchable polarization rotators 602, 606 and 610 have switched to their complimentary states (i.e., from on to off or off to on, depending on their original states). In this state of operation, the light paths for the pass-through spectrum 705 remain unchanged as in the bridge state. This design ensures that the pass-through signals are not affected by the add/drop operation and flow through the optical node without being interrupted. This can be seen from the optical paths for the pass-through spectrum 705 through the fixed polarization rotators 601, 605, and 609 shown in FIGS. 7(a) and 7(b). The pass-through spectrum 705 passes undisturbed through the entire add/drop switch 510 along an optical path that remains unchanged between the bridge state (FIG. 7(a)) and the add/drop state (FIG. 7(b)).

In contrast, the paths of the add signal and the drop signal are interchanged between the add/drop state and the bridge state, i.e., the drop signal 706 now exits at drop port 704 and the add signal 707 is combined with the pass-through signal 705 that exits through output port 703. In FIG. 7(b), the add signal 702 is again decomposed into two orthogonal polarizations. Because the first polarization rotator 602 is now set to have the output polarizations all vertical, they pass through the first stacked waveplates element 603 which rotates the polarization by 90° so that both components of the add signal 702 become horizontally polarized. These horizontally-polarized beams propagate upward in the second birefringent element 604 due to its extraordinary wave characteristic. The add signal 707 meets the drop signal 706 at the exit plane of the second birefringent element 604. These two signals containing the add/drop spectra then pass through the second polarization rotator 606, which is set for no polarization rotation. The add signal 707 continues to propagate upward through the third birefringent element 607 and meets the pass-through signal 705 at the exit plane of the third birefringent element 607. The drop signal 706, however, propagates straight through the third birefringent element 607 because it is an ordinary wave in this birefringent element 607. It is clear up to this point that the add signal and the drop signal have exchanged their paths in comparison to the bridge state shown in FIG. 7(a).

These four beams pass through the second stacked waveplates element 608. The pass-through signal 705 keeps its polarization and the add/drop signals 707, 706 rotate their polarizations by 90°. They pass through the fourth set of polarization rotators 609 and 610 such that orthogonal polarizations result. These two sets of beams are recombined by the fourth birefringent element 611 and exit to ports 703 and 704, respectively. This completes the add/drop operation of the add/drop wavelength switch 510.

Figure 8:
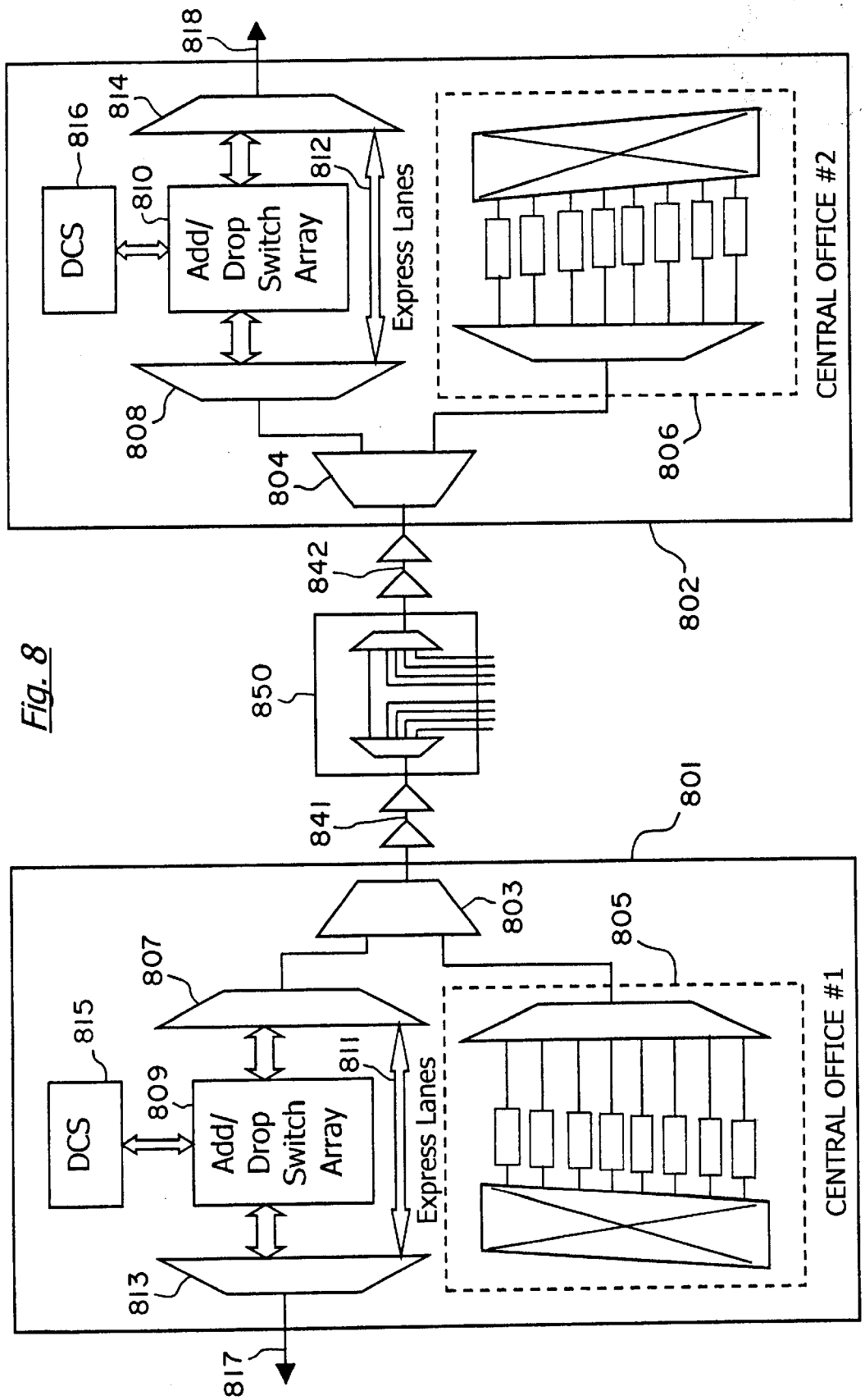
FIG. 8 is a schematic block diagram of one implementation of the present invention to expand the communications capability over an optical link between two central offices.

Central Office Embodiment. FIG. 8 provides a schematic diagram of an implementation of the present invention to supplement and enhance the capabilities of existing central offices in an optical network. Existing optical communications systems typically provide only point-to-point communications between two central offices 801, 802 over an optical link 841, 842. As WDM technology has progressed, the number of channels carried over the optical link has increased. However, many early WDM systems use central office equipment 805, 806 that is capable of handling only a relatively small number of widely spaced channels. In order to upgrade the channel capacity of such systems, it is generally necessary to completely replace the existing central office equipment, which involves considerable expense. In contrast, the present invention allows existing central office equipment to be retrofitted to handle an increased number of channels, as shown in FIG. 8.

At the receiving central office 802, the initial wavelength slicer 804 separates the WDM signal into two sets of adjacent channels, as previously discussed. One set consists of the existing channels used by the existing central office equipment 806. The other set consists of new channels that are interdigitally spaced between the existing channels. The existing channels are routed by the initial wavelength slicer 804 to the existing central office equipment 806 to be processed in accordance with the communications protocol for the existing central office equipment 806.

In contrast, the new interdigital channels are routed by the initial wavelength slicer 804 to additional wavelength slicer stages, and thence to optical filters 808 that separate the set of new channels into an array of separated channels for an add/drop switch array 810, as previously discussed. Express lanes 812 can also be provided. For example, the add ports and drop ports of the add/drop switch array 810 can be connected to a digital cross switch (DCS) 816 to interface with an external communications network. The output ports of the add/drop switch array 810 can be routed to a second wavelength slicer network 814 that combines the array of output channels and the express lanes 812 into a WDM signal that can be transmitted over a second optical link 818.

At the transmitting central office 801, these components provide the inverse operations to those described above due to their inherently bi-directional characteristics. The wavelength slicer network 807, 803 combines the existing output channels from the old central office equipment 805 with the new interdigital channels output by the add/drop switch array 809 and the express lanes 811. Here again, the add/drop switch array can be interfaced with a digital cross switch (DCS) 815 and a third optical link 817. The present invention can also be used to add or drop channels at an intermediate station 850 in the optical link 841, 842, as shown in FIG. 8.

Figure 9:
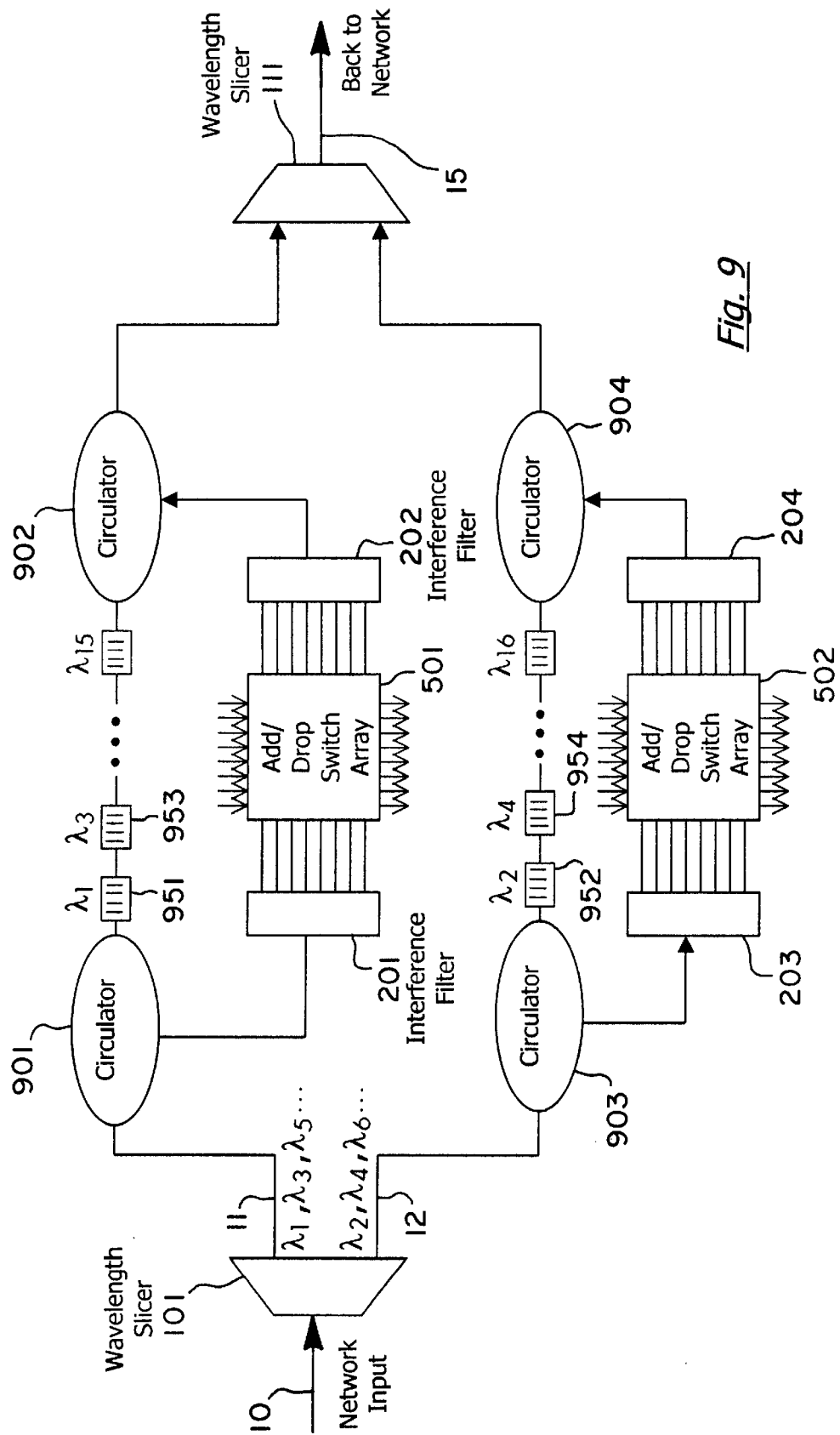
FIG. 9 is a schematic block diagram of an alternative embodiment of the present invention using circulated drop filters.

Circulated Drop Filter Embodiments. FIG. 9 is a schematic diagram of an alternative embodiment using two circulated drop filters 901, 951, 953, etc. and 903, 952, 954, etc. to separate sets of channels for two add/drop switch arrays 501, 502. Once again, the initial wavelength slicer 101 separates the input WDM signal into two set of alternating adjacent channels ($\lambda_1$, $\lambda_3$, $\lambda_5$, etc. and $\lambda_2$, $\lambda_4$, $\lambda_6$, etc.). The upper circulated drop filter 901, 951, 953, etc. receives the first set of channels, while the lower circulated drop filter 903, 952, 954, etc. receives the second set of channels.

Each circulated drop filter consists of an optical circulator 901, 903 and a series of fiber Bragg grating (FBG) filters 951, 953, etc. An optical circulator is a three port device that redirects light from port to port sequentially in only one direction. For example, light is directed sequentially from port 1 to port 2, and from port 2 to port 3. Optical circulators are commercially available from JDS FITEL, Inc. of 570 West Hunt Club Road, Nepean, Ontario, Canada K2G 5W8 (e.g., CR2300/CR2500 series).

A FBG filter is a reflection-type filter that reflects light in a predetermined frequency band and transmits light at frequencies outside of this band. In this embodiment, a series of FBG filters 951, 953, etc., of different wavelengths ($\lambda_1$, $\lambda_3$, . . . $\lambda_{15}$) are employed to reflect a corresponding series of channels. The reflected channels ($\lambda_1, \lambda_3, \ldots \lambda_{15}$) are routed by the optical circulator 901 to a first interference filter 201, which creates an array of separate channels for the add/drop switch array 501, as previously discussed with regard to FIG. 1. The remaining "express" channels pass through all of the FBG filters 951, 953, etc. to the second port of the second optical circulator 902. The output channels from the add/drop switch array 501 are combined by a second interference filter 202 and routed to the first port of the second circulator 902. The second circulator effectively combines the "express" channels with the output channels from the add/drop switch array 501.

The lower circulated drop filter 903, 952, 954, etc. has the same structure as, and operates in parallel with the upper circulated drop filter. However, the lower circulated drop filter processes $\lambda_2, \lambda_4, \ldots \lambda_6$. The output channels from the second circulators 902, 904 for both circulated drop filters are combined by a final wavelength slicer 111 to create the WDM signal that is transmitted over the second optical link 15.

It should be expressly understood that a network of wavelength slicers could be used if it is necessary to further subdivide the input WDM signal into more sets of channels. Also, any number of circulated drop filters can be use in parallel (or otherwise) to process these sets of channels. The approach shown in FIG. 9 has the advantage that the "express" channels can pass through the device with minimal loss in contrast to the system shown in FIG. 1.

The above disclosure sets forth a number of embodiments of the present invention. Other arrangements or embodiments, not precisely set forth, could be practiced under the teachings of the present invention and as set forth in the following claims.

We claim:

1. An optical wavelength add/drop multiplexer providing communications between a first optical link and a second optical link using wavelength division multiplexing (WDM) to support a plurality of channels, said multiplexer comprising:
    a wavelength slicer spatially separating channels from the first optical link into a first set of channels and a second set of channels, said wavelength slicer having:
        (a) a first polarization-dependent routing element spatially separating the channels from the first optical link into a pair of orthogonally-polarized beams;
        (b) a polarization rotator for rotating the polarization of at least one of the pair of orthogonally-polarized beams to create first and second beams having the same polarization;
        (c) a wavelength filter coupled to receive the first and second beams from the polarization rotator, said wavelength filter having a polarization dependent optical transmission function such that the first beam decomposes into third and fourth beams with their polarizations orthogonal to each other, and the second beam decomposes into fifth and sixth beams with their polarizations orthogonal to each other, wherein the third and fifth beams carry the first set of channels at a first polarization and the fourth and sixth beams carry the second set of channels at a second polarization, wherein the first and second polarizations are orthogonal; and
        (d) a second polarization-dependent routing element spatially routing the third and fifth beams carrying the first set of channels along a first optical path and the fourth and sixth beams carrying the second set of channels along a second optical path based on their polarizations;

an optical filter spatially separating at least a subset of said first set of channels into an array of separated channels;
    a programmable optical add/drop switch array having an array of input ports receiving said separated channels, an array of output ports, an array of add ports, and an array of drop ports; wherein said add/drop switch array selectively routes channels from said input ports to said drop ports, substitutes channels from said add ports in place of the dropped channels, and routes the remaining input channels and added channels to said output ports; and
    means for combining channels from said output ports of said add/drop switch array into the second optical link.

2. The optical wavelength add/drop multiplexer of claim 1 wherein said optical filter comprises an array of interference filters.

3. The optical wavelength add/drop multiplexer of claim 1 wherein said wavelength slicer further comprises means for spatially separating alternating adjacent channels from the first optical link into said first and second sets of channels.

4. The optical wavelength add/drop multiplexer of claim 1 further comprising a circulated drop filter spatially separating said first set of channels into a third set of channels and a fourth set of channels, and wherein said optical filter spatially separates said third set of channels into an array of separated channels.

5. The optical wavelength add/drop multiplexer of claim 1 further comprising means for combining said second set of channels with said channels from said output ports of said add/drop switch into the second optical link.

6. The optical wavelength add/drop multiplexer of claim 1 wherein said wavelength filter comprises a stacked plurality of birefringent waveplates with each waveplate oriented in a predetermined direction.

7. The optical wavelength add/drop multiplexer of claim 1 wherein said programmable optical add/drop switch array comprises at least one add/drop switch having a bridge state and an add/drop state determined by an external control state, with said add/drop switch having:
    an input port receiving an optical input signal;
    an output port;
    an add port receiving an optical add signal;
    a drop port;
    a first polarization-dependent routing element for spatially separating said input signal into a pair of orthogonally-polarized input beams, and spatially separating said add signal into an orthogonally-polarized pair of add beams;
    a first polarization rotator selectively rotating the polarization of at least one of said input beams so that both input beams have the same polarization determined by the control state, and selectively rotating the polarization of at least one of said add beams so that both of said add beams have the same polarization determined by the control state;
    a wavelength filter coupled to receive said input beams from said first polarization rotator, said wavelength filter having a polarization-dependent optical transmission function such that said input beams decompose into two pairs of orthogonally-polarized beam components, wherein one of each pair of orthogonally-polarized beam components carries a predetermined spectral drop band at a first polarization and the other of each pair of orthogonally-polarized beam components carries a predetermined spectral pass-through band at a second polarization, wherein said drop band and said pass-through band are substantially complementary and said first and second polarizations are orthogonal;

a second polarization-dependent routing element spatially separating said pass-through beam components and said drop beam components based on their polarizations;

a second polarization rotator selectively rotating the polarization of said spatially-separated beam components determined by the control state;

a third polarization-dependent routing element combining and routing said add beams and said pass-through beam components along a pair of output optical paths, and routing said drop beam components along a pair of drop optical paths in said add/drop state; and combining and routing said drop beam components and said pass-through beam components along said output optical paths, and routing said add beams along said drop optical paths in said bridge state;

a third polarization rotator selectively rotating the polarization of at least one of the pair of output beams such that said output beam pair is orthogonally polarized, and rotating the polarization of at least one of the pair of drop beams such that said drop beam pair is orthogonally polarized; and a polarization combining element combining said orthogonally-polarized output beam pair at said output port, and combining said orthogonally-polarized drop beam pair at said drop port.

8. The optical wavelength add/drop multiplexer of claim 1 further comprising at least a second stage of at least one wavelength slicer spatially separating alternating channels from said first set of channels into a plurality of subsets of said first set of channels.

9. The optical wavelength add/drop multiplexer of claim 8 wherein said stages of wavelength slicers comprise a binary tree network of wavelength slicers.

10. An optical wavelength add/drop multiplexer providing communications between a first optical link and a second optical link using wavelength division multiplexing (WDM) to support a plurality of channels, said multiplexer comprising:

a wavelength slicer spatially separating alternating channels from the first optical link into a first set of channels and a second set of channels;

means for spatially separating at least a subset of said second subset of channels into a third set of channels and a fourth set of channels;

an optical filter spatially separating at least a subset of the third set of channels into an array of separated channels;

a programmable optical add/drop switch array having an array of input ports receiving said separated channels, an array of output ports, an array of add ports, and an array of drop ports; wherein said add/drop switch array selectively routes channels from said input ports to said drop ports, substitutes channels from said add ports in place of the dropped channels, and routes the remaining input channels and added channels to said output ports; and a combiner operable to combine channels from said output ports of said add/drop switch array into the second optical link.

11. The optical wavelength add/drop multiplexer of claim 10 wherein said optical filter comprises an array of interference filters.

12. The optical wavelength add/drop multiplexer of claim 10 wherein said stages of wavelength slicers comprise a binary tree network of wavelength slicers.

13. The optical wavelength add/drop multiplexer of claim 10 further comprising means for combining said fourth set of channels with said channels from said output ports of said add/drop switch into the second optical link.

14. The optical wavelength add/drop multiplexer of claim 10 wherein said wavelength slicer comprises:

a first polarization-dependent routing element spatially separating said channels from the first optical link into a pair of orthogonally-polarized beams;

a polarization rotator for rotating the polarization of at least one of said pair of orthogonally-polarized beams to create first and second beams having the same polarization;

a wavelength filter coupled to receive said first and second beams from said polarization rotator, said wavelength filter having a polarization dependent optical transmission function such that the said first beam decomposes into third and fourth beams with their polarizations orthogonal to each other, and said second beam decomposes into fifth and sixth beams with their polarizations orthogonal to each other, wherein said third and fifth beams carry said first set of channels at a first polarization and said fourth and sixth beams carry said second set of channels at a second polarization, wherein said first and second polarizations are orthogonal; and a second polarization-dependent routing element spatially routing said third and fifth beams carrying said first set of channels along a first optical path and said fourth and sixth beams carrying said second set of channels along a second optical path based on their polarizations.

15. The optical wavelength add/drop multiplexer of claim 10 wherein said programmable optical add/drop switch array comprises at least one add/drop switch having a bridge state and an add/drop state determined by an external control state, with said add/drop switch having:

an input port receiving an optical input signal;

an output port;

an add port receiving an optical add signal;

a drop port;

a first polarization-dependent routing element for spatially separating said input signal into a pair of orthogonally-polarized input beams, and spatially separating said add signal into an orthogonally-polarized pair of add beams;

a first polarization rotator selectively rotating the polarization of at least one of said input beams so that both input beams have the same polarization determined by the control state, and selectively rotating the polarization of at least one of said add beams so that both of said add beams have the same polarization determined by the control state;

a wavelength filter coupled to receive said input beams from said first polarization rotator, said wavelength filter having a polarization-dependent optical transmission function such that said input beams decompose into two pairs of orthogonally-polarized beam components, wherein one of each pair of orthogonally-polarized beam components carries a predetermined spectral drop band at a first polarization and the other of each pair of orthogonally-polarized beam components carries a predetermined spectral pass-through band at a second polarization, wherein said drop band and said pass-through band are substantially complementary and said first and second polarizations are orthogonal;

a second polarization-dependent routing element spatially separating said pass-through beam components and said drop beam components based on their polarizations;

a second polarization rotator selectively rotating the polarization of said spatially-separated beam components determined by the control state;

a third polarization-dependent routing element combining and routing said add beams and said pass-through beam components along a pair of output optical paths, and routing said drop beam components along a pair of drop optical paths in said add/drop state; and combining and routing said drop beam components and said pass-through beam components along said output optical paths, and routing said add beams along said drop optical paths in said bridge state;

a third polarization rotator selectively rotating the polarization of at least one of the pair of output beams such that said output beam pair is orthogonally polarized, and rotating the polarization of at least one of the pair of drop beams such that said drop beam pair is orthogonally polarized; and a polarization combining element combining said orthogonally-polarized output beam pair at said output port, and combining said orthogonally-polarized drop beam pair at said drop port.

16. An optical wavelength add/drop multiplexer providing communications between a first optical link and a second optical link using wavelength division multiplexing (WDM) to support a plurality of channels, said multiplexer comprising:

a wavelength slicer spatially separating channels from the first optical link into a first set of channels and a second set of channels;

a first circulator spatially separating at least a subset of said first set of channels into a third set of channels and a fourth set of channels;

an optical filter spatially separating at least a subset of said third set of channels into an array of separated channels;

a programmable optical add/drop switch array having an array of input ports receiving said separated channels, an array of output ports, an array of add ports, and an array of drop ports; wherein said add/drop switch array selectively routes channels from said input ports to said drop ports, substitutes channels from said add ports in place of the dropped channels, and routes the remaining input channels and added channels to said output ports; and a second circulator combining channels from said output ports of said add/drop switch array and said fourth set of channels into said second optical link.

17. The optical wavelength add/drop multiplexer of claim 16 wherein said optical filter comprises an array of interference filters.

18. A method for optical wavelength add/drop multiplexing providing communications between a first optical link and a second optical link using wavelength division multiplexing (WDM) to support a plurality of channels, said method comprising:

spatially separating channels from the first optical link into a first set of channels and a second set of channels by:

(a) spatially separating the channels from the first optical link into a pair of orthogonally-polarized beams;

(b) rotating the polarization of at least one of the pair of orthogonally-polarized beams to create first and second beams having the same polarization;

(c) filtering the first and second beams using a wavelength filter having a polarization dependent optical transmission function such that the first beam decomposes into third and fourth beams with their polarizations orthogonal to each other, and the second beam decomposes into fifth and sixth beams with their polarizations orthogonal to each other, wherein the third and fifth beams carry the first set of channels at a first polarization and the fourth and sixth beams carry the second set of channels at a second polarization, wherein the first and second polarizations are orthogonal; and (d) spatially routing the third and fifth beams carrying the first set of channels along a first optical path and the fourth and sixth beams carrying the second set of channels along a second optical path based on their polarizations;

spatially separating at least a subset of the first set of channels into an array of separated channels;

providing a programmable optical add/drop switch array having an array of input ports receiving said separated channels, an array of output ports, an array of add ports, and an array of drop ports; wherein the add/drop switch array selectively routes channels from the input ports to the drop ports, substitutes channels from the add ports in place of the dropped channels, and routes the remaining input channels and added channels to the output ports; and combining channels from the output ports of the add/drop switch array into the second optical link.

19. The method of claim 18 wherein the step of spatially separating at least a subset of the first set of channels into an array of separated channels is performed by an array of interference filters.

20. The method of claim 18 wherein the step of spatially separating channels further comprises spatially separating even channels from the first optical link into the first set of channels and odd channels from the first optical link into the second set of channels.

21. The method of claim 18 wherein the wavelength filter comprises a stacked plurality of birefringent waveplates with each waveplate oriented in a predetermined direction.

22. The method of claim 18 further comprising spatially separating alternating channels from the first set of channels into a plurality of subsets of said first set of channels.

23. An optical add/drop switch having a bridge state and an add/drop state determined by an external control state, said add/drop switch comprising:

an input port receiving an optical input signal;

an output port;

an add port receiving an optical add signal;

a drop port;

a first polarization-dependent routing element for spatially separating said input signal into a pair of orthogonally-polarized input beams, and spatially separating said add signal into an orthogonally-polarized pair of add beams;

a first polarization rotator selectively rotating the polarization of at least one of said input beams so that both input beams have the same polarization determined by the control state, and selectively rotating the polarization of at least one of said add beams so that both of said add beams have the same polarization determined by the control state;

a wavelength filter coupled to receive said input beams from said first polarization rotator, said wavelength filter having a polarization-dependent optical transmission function such that said input beams decompose into two pairs of orthogonally-polarized beam components, wherein one of each pair of orthogonally-polarized beam components carries a predetermined spectral drop band at a first polarization and the other of each pair of orthogonally-polarized beam components carries a predetermined spectral pass-through band at a second polarization, wherein said drop band and said pass-through band are substantially complementary and said first and second polarizations are orthogonal;

a second polarization-dependent routing element spatially separating said pass-through beam components and said drop beam components based on their polarizations;

a second polarization rotator selectively rotating the polarization of said spatially-separated beam components determined by the control state;

a third polarization-dependent routing element combining and routing said add beams and said pass-through beam components along a pair of output optical paths, and routing said drop beam components along a pair of drop optical paths in said add/drop state; and combining and routing said drop beam components and said pass-through beam components along said output optical paths, and routing said add beams along said drop optical paths in said bridge state;

a third polarization rotator selectively rotating the polarization of at least one of the pair of output beams such that said output beam pair is orthogonally polarized, and rotating the polarization of at least one of the pair of drop beams such that said drop beam pair is orthogonally polarized; and a polarization combining element combining said orthogonally-polarized output beam pair at said output port, and combining said orthogonally-polarized drop beam pair at said drop port.

24. The optical add/drop switch of claim 23 wherein said wavelength filter comprises a stacked plurality of birefringent waveplates with each waveplate oriented in a predetermined direction.

25. The optical add/drop switch of claim 24 wherein the birefringent waveplates comprise a birefringent material selected from the group consisting of calcite, rutile, $YVO_4$, and $LiNbO_3$.

26. A method for optical add/drop switching having a bridge state and an add/drop state determined by an external control state, said method comprising the step of:

spatially separating an input signal into a pair of orthogonally-polarized input beams;

spatially separating an add signal into an orthogonally-polarized pair of add beams;

selectively rotating the polarization of at least one of orthogonally-polarized input beams so that both input beams have the same polarization determined by the control state;

selectively rotating the polarization of at least one of the orthogonally-polarized add beams so that both add beams have the same polarization determined by the control state;

filtering the input beams using a wavelength filter having a polarization-dependent optical transmission function such that the input beams decompose into two pairs of orthogonally-polarized beam components, wherein one of each pair of orthogonally-polarized beam components carries a predetermined spectral drop band at a first polarization and the other of each pair of orthogonally-polarized beam components carries a predetermined spectral pass-through band at a second polarization, wherein the drop band and the pass-through band are substantially complementary and the first and second polarizations are orthogonal;

spatially separating the pass-through beam components and drop beam components based on their polarizations;

selectively rotating the polarization of the spatially-separated beam components determined by the control state;

combining and routing the add beams and pass-through beam components along a pair of output optical paths, and routing the drop beam components along a pair of drop optical paths in the add/drop state; and combining and routing the drop beam components and pass-through beam components along the output optical paths, and routing the add beams along the drop optical paths in the bridge state;

selectively rotating the polarization of at least one of the pair of output beams such that the output beam pair is orthogonally polarized, and rotating the polarization of at least one of the pair of drop beams such that the drop beam pair is orthogonally polarized; and combining the orthogonally-polarized output beam pair at an output port; and combining the orthogonally-polarized drop beam pair at a drop port.

27. The method of claim 26 wherein the wavelength filter comprises a stacked plurality of birefringent waveplates with each waveplate oriented in a predetermined direction.

28. The method of claim 27 wherein the birefringent waveplates comprise a birefringent material selected from the group consisting of calcite, rutile, $YVO_4$, and $LiNbO_3$.

29. In a central office having central office equipment communicating over a first optical link using a first set of optical channels, the improvement comprising:

a wavelength slicer receiving optical signals over the first optical link and separating the first set of channels from a second set of channels, wherein the first set of channels are directed to the central office equipment for processing separately from the second set of channels; and an optical filter spatially separating at least a subset of the second set of channels into an array of separated channels;

a programmable optical add/drop switch array having an array of input ports receiving the separated channels, an array of output ports, an array of add ports, and an array of drop ports; wherein said add/drop switch array selectively routes channels from the input ports to the drop ports, substitutes channels from the add ports in place of the dropped channels, and routes the remaining input channels and added channels to the output ports; and an element combining channels from the output ports of the add/drop switch array into a second optical link.

30. The central office of claim 29 wherein the second set of channels is interdigitally spaced with regard to the first set of channels.

31. The central office of claim 29 wherein the wavelength slicer and the optical filter are bidirectional, such that the wavelength slicer further combines the second set of channels from the optical filter with the first set of channels from the central office equipment for transmission over the first optical link.

32. The central office of claim 29 wherein the wavelength slicer comprises:

a first polarization-dependent routing element spatially separating the channels from the first optical link into a pair of orthogonally-polarized beams;

a polarization rotator for rotating the polarization of at least one of the pair of orthogonally-polarized beams to create first and second beams having the same polarization;

a wavelength filter coupled to receive the first and second beams from the polarization rotator, said wavelength filter having a polarization dependent optical transmission function such that the first beam decomposes into third and fourth beams with their polarizations orthogonal to each other, and the second beam decomposes into fifth and sixth beams with their polarizations orthogonal to each other, wherein the third and fifth beams carry the first set of channels at a first polarization and the fourth and sixth beams carry the second set of channels at a second polarization, wherein the first and second polarizations are orthogonal; and a second polarization-dependent routing element spatially routing the third and fifth beams carrying the first set of channels along a first optical path and the fourth and sixth beams carrying the second set of channels along a second optical path based on their polarizations.

33. The central office of claim 29 wherein said programmable optical add/drop switch array comprises at least one add/drop switch having a bridge state and an add/drop state determined by an external control state, with said add/drop switch having:

an input port receiving an optical input signal;

an output port;

an add port receiving an optical add signal;

a drop port;

a first polarization-dependent routing element for spatially separating said input signal into a pair of orthogonally-polarized input beams, and spatially separating said add signal into an orthogonally-polarized pair of add beams;

a first polarization rotator selectively rotating the polarization of at least one of said input beams so that both input beams have the same polarization determined by the control state, and selectively rotating the polarization of at least one of said add beams so that both of said add beams have the same polarization determined by the control state;

a wavelength filter coupled to receive said input beams from said first polarization rotator, said wavelength filter having a polarization-dependent optical transmission function such that said input beams decompose into two pairs of orthogonally-polarized beam components, wherein one of each pair of orthogonally-polarized beam components carries a predetermined spectral drop band at a first polarization and the other of each pair of orthogonally-polarized beam components carries a predetermined spectral pass-through band at a second polarization, wherein said drop band and said pass-through band are substantially complementary and said first and second polarizations are orthogonal;

a second polarization-dependent routing element spatially separating said pass-through beam components and said drop beam components based on their polarizations;

a second polarization rotator selectively rotating the polarization of said spatially-separated beam components determined by the control state;

a third polarization-dependent routing element combining and routing said add beams and said pass-through beam components along a pair of output optical paths, and routing said drop beam components along a pair of drop optical paths in said add/drop state; and combining and routing said drop beam components and said pass-through beam components along said output optical paths, and routing said add beams along said drop optical paths in said bridge state;

a third polarization rotator selectively rotating the polarization of at least one of the pair of output beams such that said output beam pair is orthogonally polarized, and rotating the polarization of at least one of the pair of drop beams such that said drop beam pair is orthogonally polarized; and a polarization combining element combining said orthogonally-polarized output beam pair at said output port, and combining said orthogonally-polarized drop beam pair at said drop port.

34. A method of augmenting optical signal processing of central office equipment operable to process a first set of channels from a first optical link, the method comprising:

spatially separating channels from the first optical link into a first set of channels and a second set of channels;

communicating the first set of channels to central office equipment for processing separate from the second set of channels; and at an add/drop switch that receives the second set of channels:

receiving the second set of channels at an array of input ports;

receiving a set of add channels at an array of add ports;

selectively routing at least some channels from selected ones of the input ports to the selected ones of the output ports;

substituting add channels from selected ones of the add ports for channels received at selected ones of the input ports; and communicating the substituted add channels to selected ones of the output ports.

35. The method of claim 34, wherein spatially separating channels from the first optical link into a first set of channels and a second set of channels comprises:

spatially separating the channels from the first optical link into a pair of orthogonally-polarized beams;

rotating the polarization of at least one of the pair of orthogonally-polarized beams to create first and second beams having the same polarization;

filtering the first and second beams using a wavelength filter operable to decompose the first beam into third and fourth beams having orthogonal polarizations to one another, and to decompose the second beam into fifth and sixth beams having orthogonal polarizations to one another, wherein the third and fifth beams carry the first set of channels at a first polarization and the fourth and sixth beams carry the second set of channels at a second polarization orthogonal to the first polarization; and spatially routing based on their polarizations the third and fifth beams carrying the first set of channels along a first optical path toward the central office equipment, and the fourth and sixth beams carrying the second set of channels along a second optical path toward the add/drop switch.

36. The method of claim 35, wherein the wavelength filter comprises a stacked plurality of birefringent waveplates with each waveplate oriented in a predetermined direction.

37. The central office of claim 34 wherein the second set of channels is interdigitally spaced with regard to the first set of channels.

38. The method of claim 34, further comprising spatially separating at least a subset of the second set of channels into an array of separated channels using an optical filter.

39. The method of claim 38 wherein the optical filter comprises an array of interference filters.

* * * * *